(12) United States Patent
Lee et al.

(10) Patent No.: US 11,626,920 B2
(45) Date of Patent: Apr. 11, 2023

(54) METHOD FOR TERMINAL TO PERFORM RADIO LINK MONITORING IN WIRELESS COMMUNICATION SYSTEM FOR SUPPORTING SIDELINK AND APPARATUS THEREFOR

(71) Applicant: LG ELECTRONICS INC., Seoul (KR)

(72) Inventors: Seungmin Lee, Seoul (KR); Heejin Kim, Seoul (KR); Sunghoon Jung, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 17/261,760

(22) PCT Filed: Aug. 8, 2019

(86) PCT No.: PCT/KR2019/010020
§ 371 (c)(1),
(2) Date: Jan. 20, 2021

(87) PCT Pub. No.: WO2020/032653
PCT Pub. Date: Feb. 13, 2020

(65) Prior Publication Data
US 2021/0336688 A1    Oct. 28, 2021

Related U.S. Application Data

(60) Provisional application No. 62/716,298, filed on Aug. 8, 2018.

(51) Int. Cl.
*H04B 7/08*     (2006.01)
*H04W 76/19*    (2018.01)
(Continued)

(52) U.S. Cl.
CPC ............. *H04B 7/088* (2013.01); *H04L 1/203* (2013.01); *H04W 48/16* (2013.01); *H04W 76/19* (2018.02); *H04W 92/18* (2013.01)

(58) Field of Classification Search
CPC . H04W 16/28; H04W 48/20; H04W 74/0833; H04W 76/19; H04W 24/08;
(Continued)

(56) References Cited

U.S. PATENT DOCUMENTS

2017/0059713 A1 *   3/2017   Heo ..................... G01S 17/931
2018/0110066 A1     4/2018   Luo et al.
(Continued)

FOREIGN PATENT DOCUMENTS

WO       2018074708 A1     4/2018

OTHER PUBLICATIONS

ASUSTeK, "Remaining details on search space", 3GPP TSG-RAN WG1 Meeting #93, May 21-25, 2018, R1-1807238.
(Continued)

*Primary Examiner* — Fred A Casca
(74) *Attorney, Agent, or Firm* — Dentons US LLP

(57) ABSTRACT

Disclosed are a method and an apparatus for a terminal to perform a radio link monitoring in a wireless communication system for supporting a sidelink according to various embodiments. Disclosed are a method and an apparatus for a terminal to perform a radio link monitoring in a wireless communication system for supporting a sidelink, the method comprising: a step of setting a beam failure recovery (BFR) parameter for a plurality of services on the basis of service attributes, for each service; and a step of independently sensing a beam failure for at least one beam corresponding to each service on the basis of a block error ratio (BLER) threshold value included in the BFR parameter and the number of beam failure instances (BFIs).

13 Claims, 24 Drawing Sheets

(51) Int. Cl.
  *H04L 1/20*    (2006.01)
  *H04W 48/16*   (2009.01)
  *H04W 92/18*   (2009.01)

(58) Field of Classification Search
  CPC ........... H04W 24/04; H04B 7/06; H04B 7/08;
           H04B 7/086; H04B 7/088; H04B 7/0617;
                                    H04B 7/0695
  See application file for complete search history.

(56) References Cited

U.S. PATENT DOCUMENTS

2018/0138962 A1\*  5/2018  Islam .................... H04B 7/0695
2019/0306920 A1\*  10/2019 Son ........................ H04L 5/0055
2021/0282168 A1\*  9/2021  Matsumura ....... H04W 72/1273

OTHER PUBLICATIONS

Nokia, Nokia Shanghai Bell, "Remaining details on prioritized RACH", 3GPP TSG-RAN WG2 Meeting #101bis, Apr. 16-20, 2018, R2-1805680.
ASUSTeK, "On the validity of BFD counting for BFR procedure", 3GPP TSG-RAN WG2 Meeting #102, May 21-25, 2018, R2-1806904.

\* cited by examiner

FIG. 5
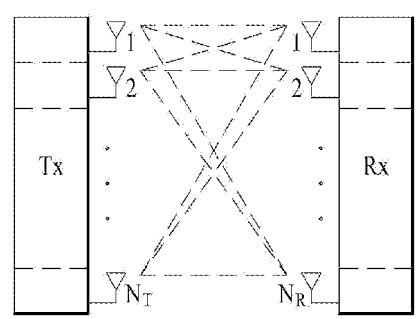
(a)
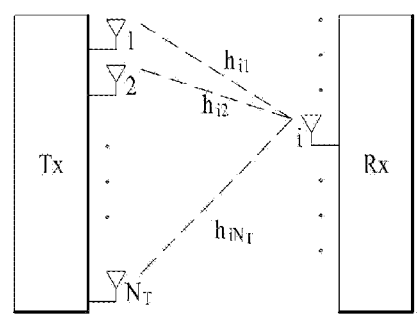
(b)

FIG. 8
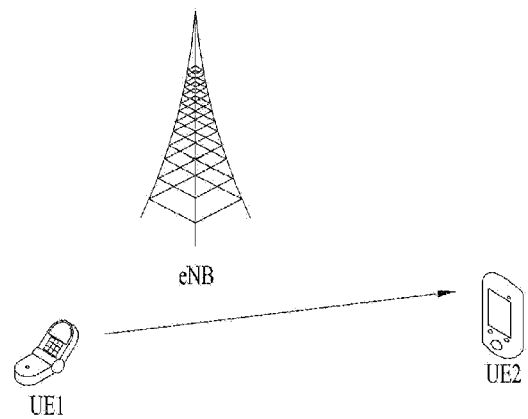
(a)
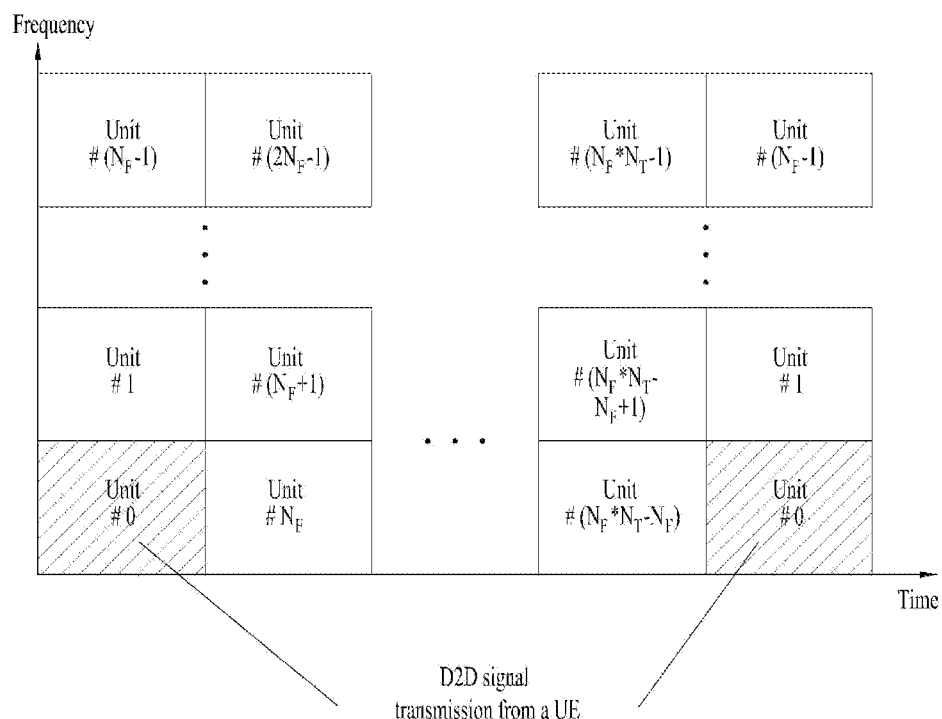
(b)

FIG. 9
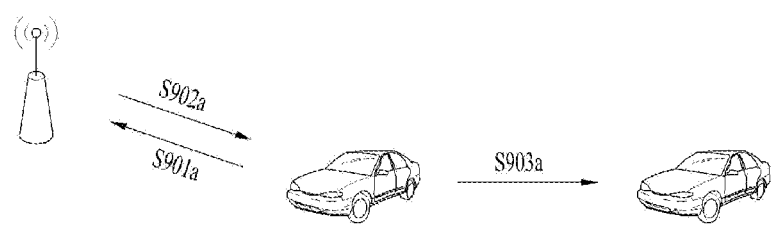
(a)
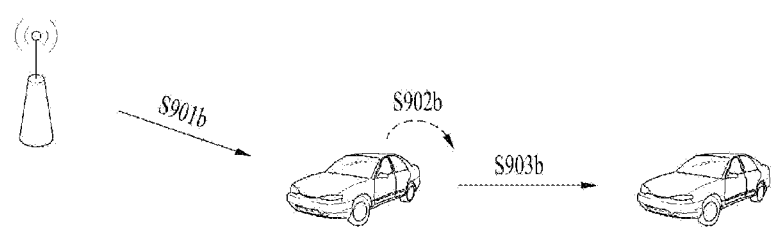
(b)

FIG. 12
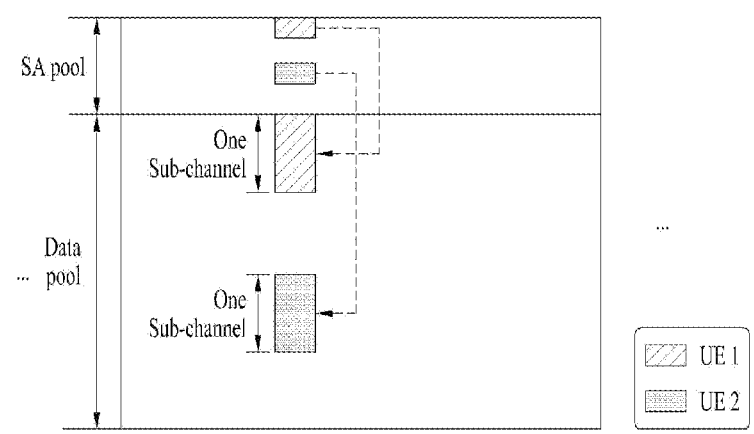
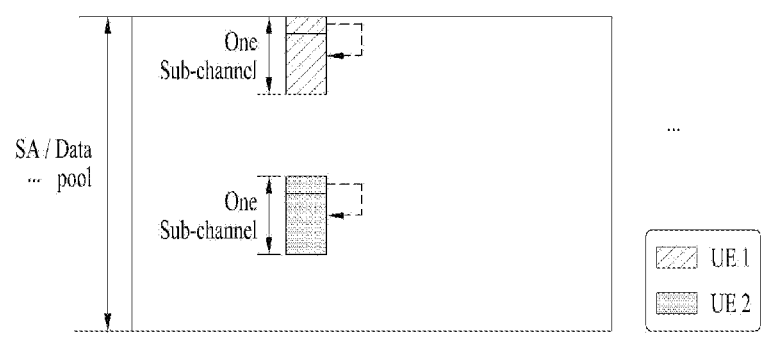

FIG. 18

| Frequency Range | scenario | Type 1 Delay (us) | Type 2 Delay (us) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

METHOD FOR TERMINAL TO PERFORM RADIO LINK MONITORING IN WIRELESS COMMUNICATION SYSTEM FOR SUPPORTING SIDELINK AND APPARATUS THEREFOR

This application is the National Stage filing under 35 U.S.C. 371 of International Application No. PCT/KR2019/010020, filed on Aug. 8, 2019, which claims the benefit of U.S. Provisional Application No. 62/716,298, filed on Aug. 8, 2018, the contents of which are all hereby incorporated by reference herein in their entirety.

TECHNICAL FIELD

The present disclosure relates to a wireless communication system, and more particularly, to a method for performing radio link monitoring by a UE in a wireless communication system supporting a sidelink and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present disclosure is to provide a method for performing an optimal BFR operation suitable for each of service requirements in accordance with a configuration of BFR parameters based on service attributes per service.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for performing radio link monitoring by a UE in a wireless communication system supporting a sidelink comprises the steps of configuring a beam failure recovery (BFR) parameter for each of a plurality of services on the basis of service attributes, and independently detecting a beam failure for at least one beam corresponding to each service on the basis of a block error ratio (BLER) threshold value and beam failure instance (BFI) times included in the BFR parameter.

The service attributes include at least one of priority, latency requirements, and reliability.

The BLER threshold value is set per service on the basis of the priority.

The BLER threshold value is set to a relatively low value with respect to services of high priority among the plurality of services.

The BFI times is set to a relatively low value with respect to services of high priority among the plurality of services.

The beam in which the beam failure is detected is at least one beam in which BLER that has exceeded the BLER threshold is continuously detected for a preset time included in the BFR parameter and its detected times is more than the BFI times.

The preset time is set to a low value with respect to services of high priority among the plurality of services.

The method further comprises the step of discovering new beam for a service corresponding to at least one beam in which the beam failure is detected, among the plurality of services, on the basis of a preset measurement threshold included in the BFR parameter.

The BFR parameter further includes information on an interference level allowed for at least one beam corresponding to another service based on discovery of new beam for one service among the plurality of services.

The allowed interference level is relatively set among the plurality of services on the basis of priority of each of the plurality of services.

The preset measurement threshold is set to a high value with respect to services of high priority among the plurality of services.

The preset measurement threshold includes a threshold value for at least one of RSRQ (Reference Signal Received Quality) and RSRP (Reference Signal Received Power).

In the case that the UE performs sidelink communication through PC5 interface with another UE, the UE reports first control information related to management of at least one beam related to the PC5 interface to a BS, and the BS transmits second control information based on the reported first control information to another UE through UU interface.

In the case that the UE transmits at least one beam from a first band of 6 Ghz or more, control information related to management of at least one beam is received from a second band less than 6 Ghz.

The method further comprises the step of transmitting mapping information between the plurality of services and at least one beam corresponding to each of the plurality of services or configuration information of the BFR parameter per service.

A plurality of antenna units are disposed to be mutually distributed to acquire variety of transmission and reception directions through physical distribution among the antenna units.

In another aspect of the present disclosure, a device for performing radio link monitoring in a wireless communication system supporting a sidelink comprises a memory for storing a program, and a processor for performing BFR (Beam Failure Recovery) on the basis of the program stored in the memory, wherein the processor configures the BFR parameter for each of a plurality of services on the basis of service attributes in accordance with the program stored in the memory, and detects a beam failure for at least one beam corresponding to each service on the basis of a block error ratio (BLER) threshold value and beam failure instance (BFI) times included in the BFR parameter.

The processor receives a user input and switches a driving mode of a vehicle related to the device from an autonomous driving mode to a manual driving mode or vice versa.

Advantageous Effects

According to various embodiments of the present disclosure, an optimal BFR operation suitable for each of service requirements may be performed in accordance with a configuration of BFR parameters based on service attributes per service.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas;

FIG. 8 is a view illustrating an exemplary D2D resource pool for D2D communication;

FIG. 9 is a view illustrating transmission modes and scheduling schemes for vehicle-to-everything (V2X);

FIG. 12 is a view illustrating SA and data transmission in V2X;

FIGS. 17 and 18 are views illustrating an operation related to BWP switching latency;

BEST MODE FOR CARRYING OUT THE INVENTION

Figure 1:
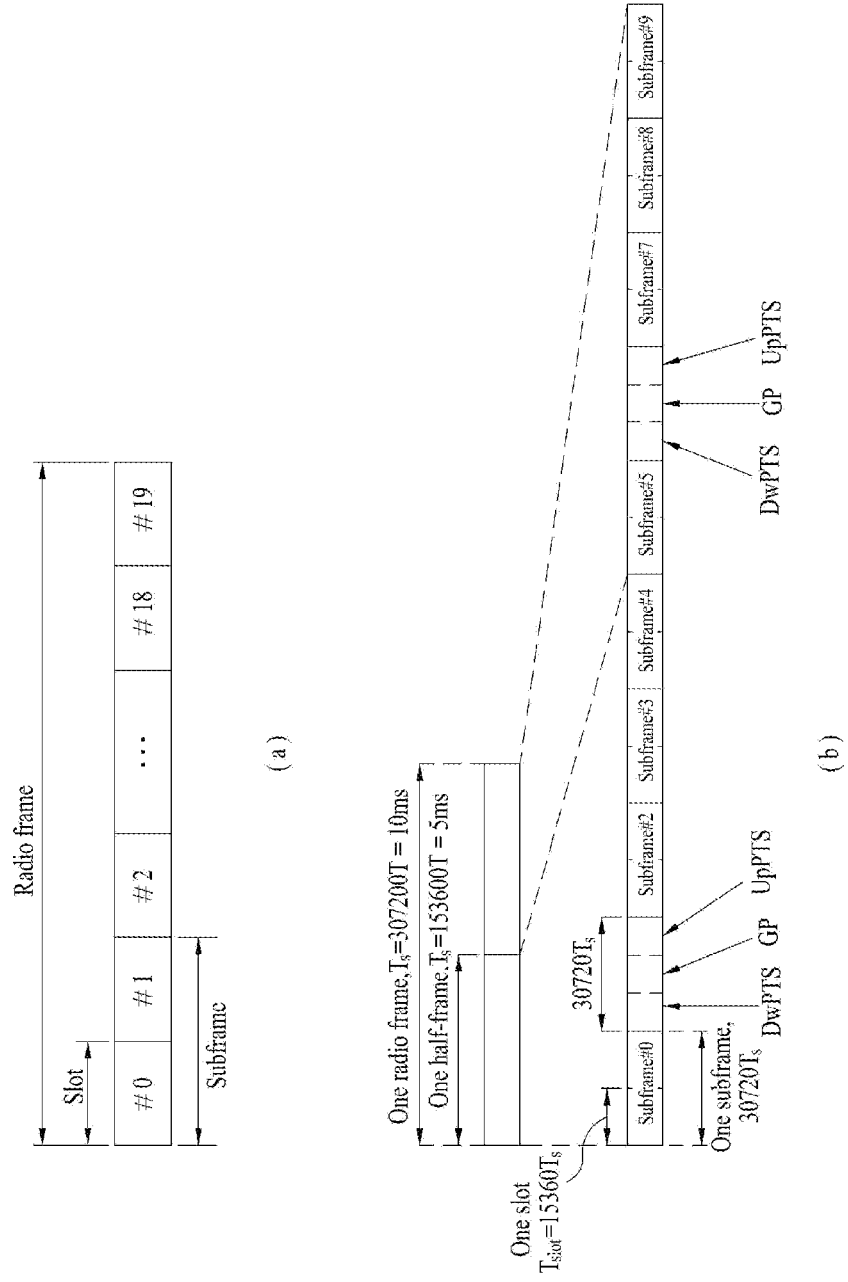
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency-division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
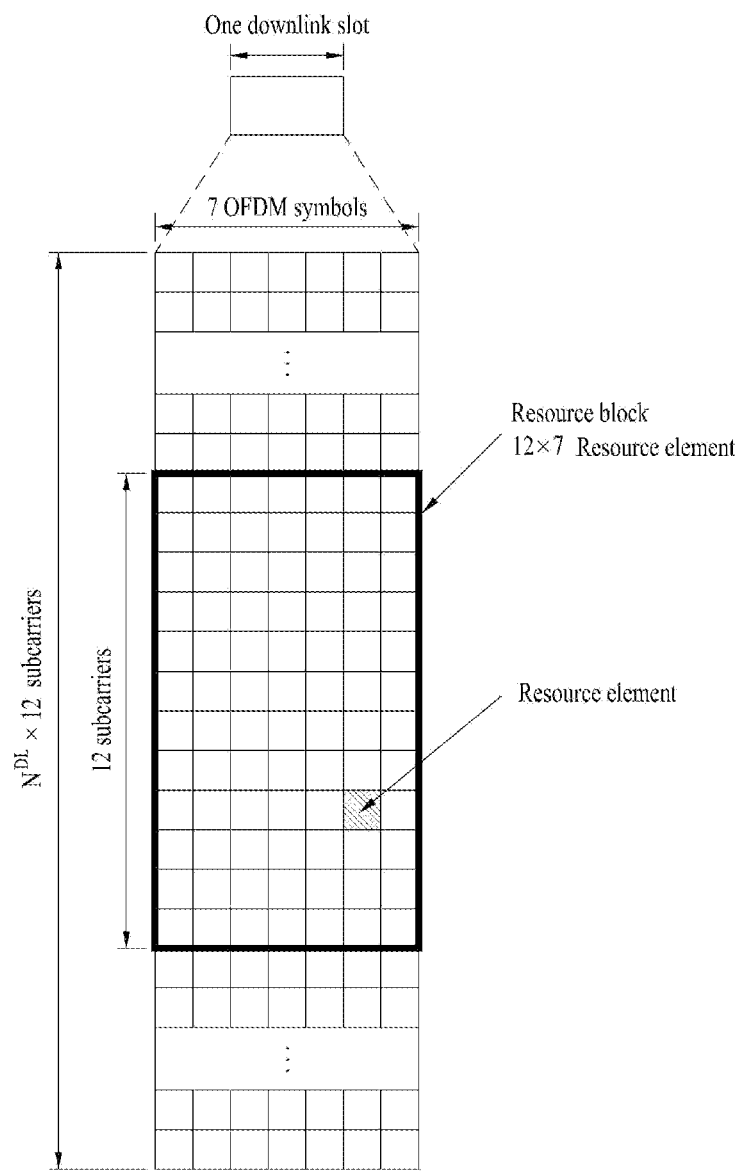
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
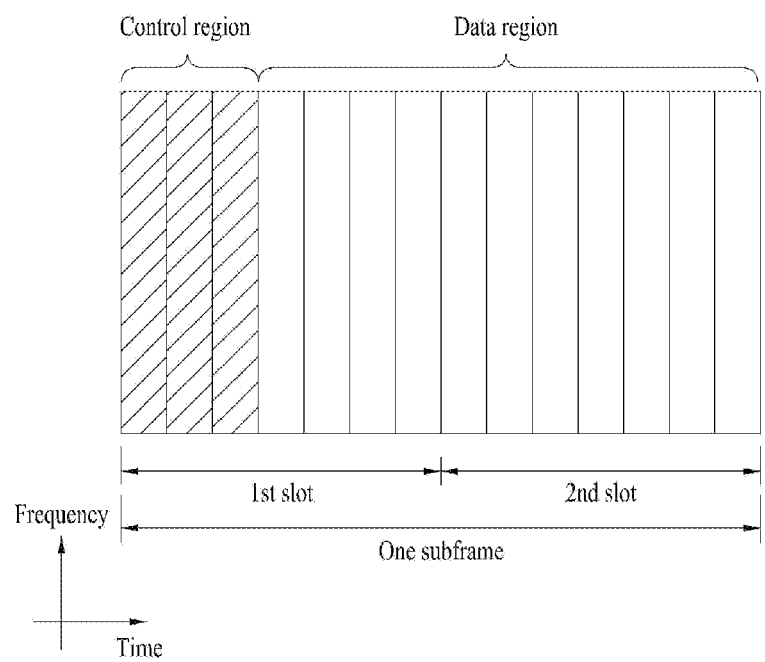
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
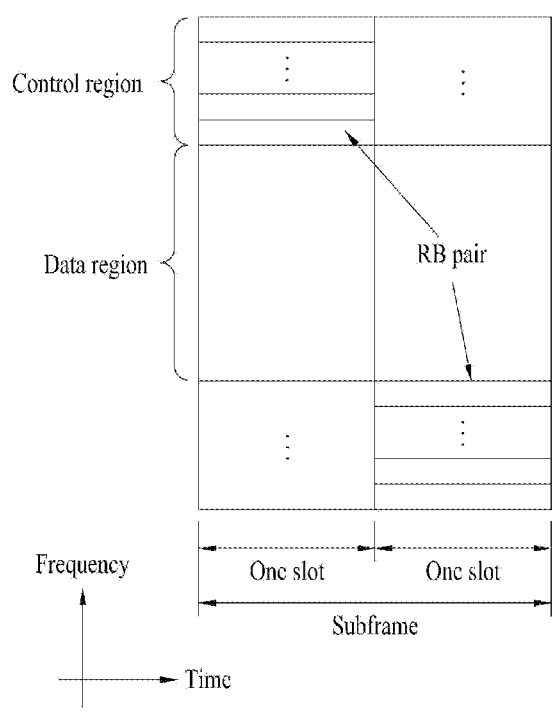
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_T} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_T 1} & h_{N_T 2} & \cdots & h_{N_T N_T} \end{bmatrix} \begin{bmatrix} x_1 \\ x_2 \\ \vdots \\ x_j \\ \vdots \\ x_{N_T} \end{bmatrix} + \quad \text{[Equation 10]}$$

$$\begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
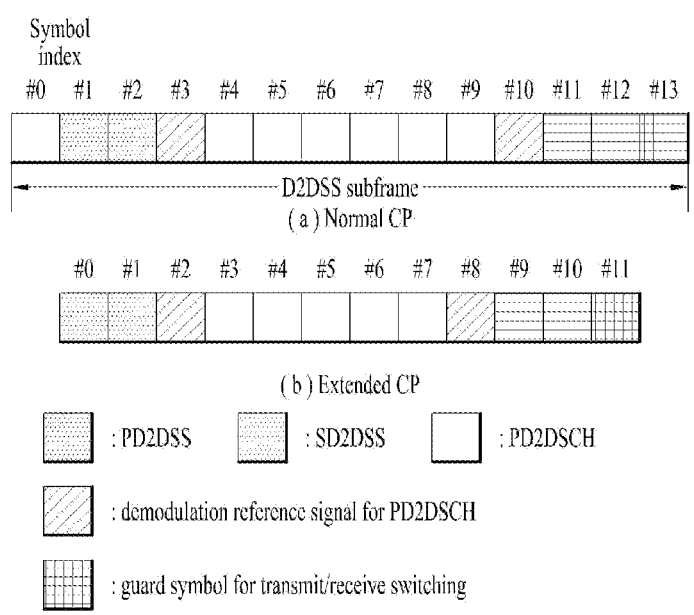
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a downlink (DL) primary synchronization signal (PSS), the PD2DSS may use a different Zadoff-Chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike the DL PSS/SSS (secondary synchronization signal), the PD2DSS/SD2DSS follows an uplink (UL) subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
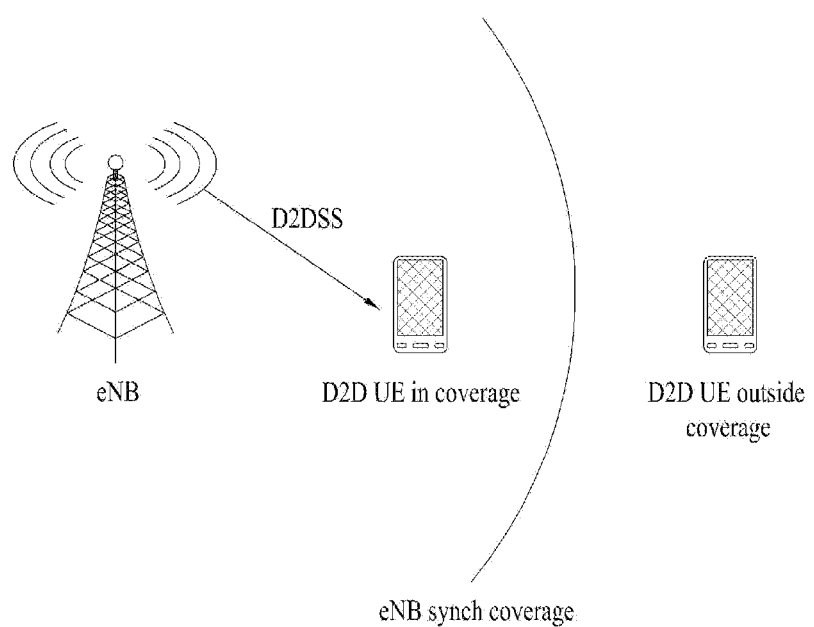
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
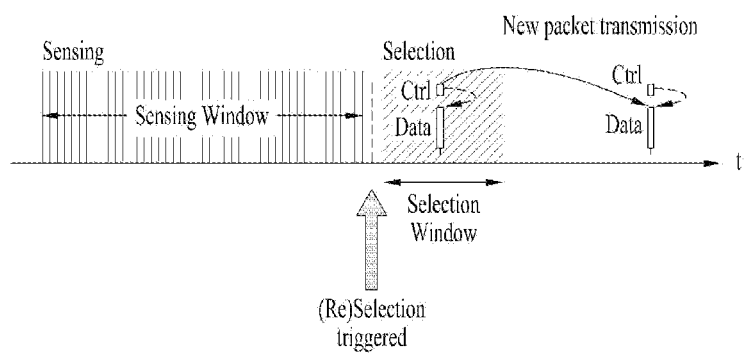
FIG. 10 is a view illustrating a method of selecting resources in V2X.
Figure 11:
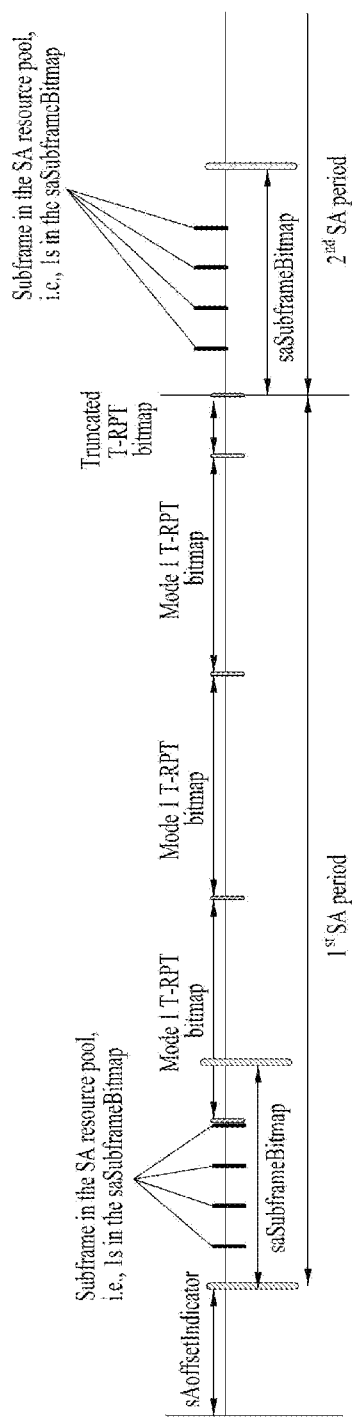
FIG. 11 is a view illustrating scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
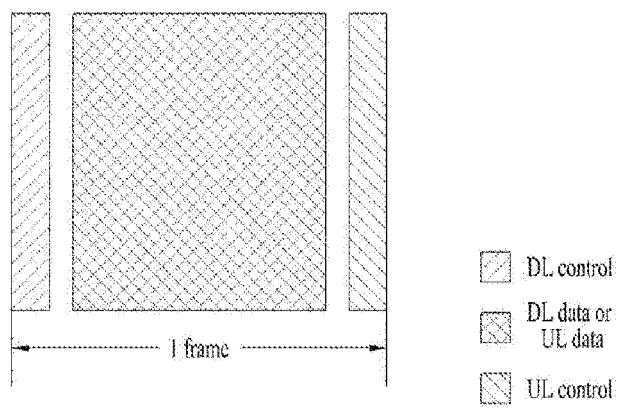
FIGS. 13 and 14 are views illustrating a new radio access technology (NRAT) frame structure.
Figure 14:
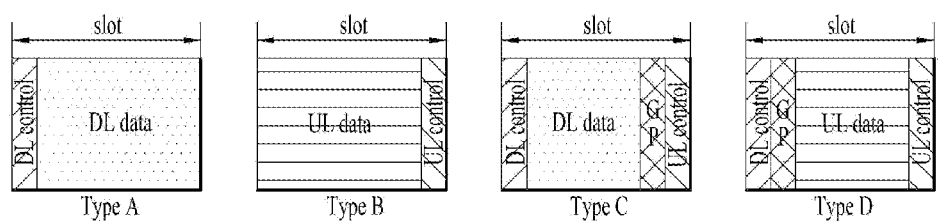

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Distributed Antenna Units (DUs)

Figure 15:
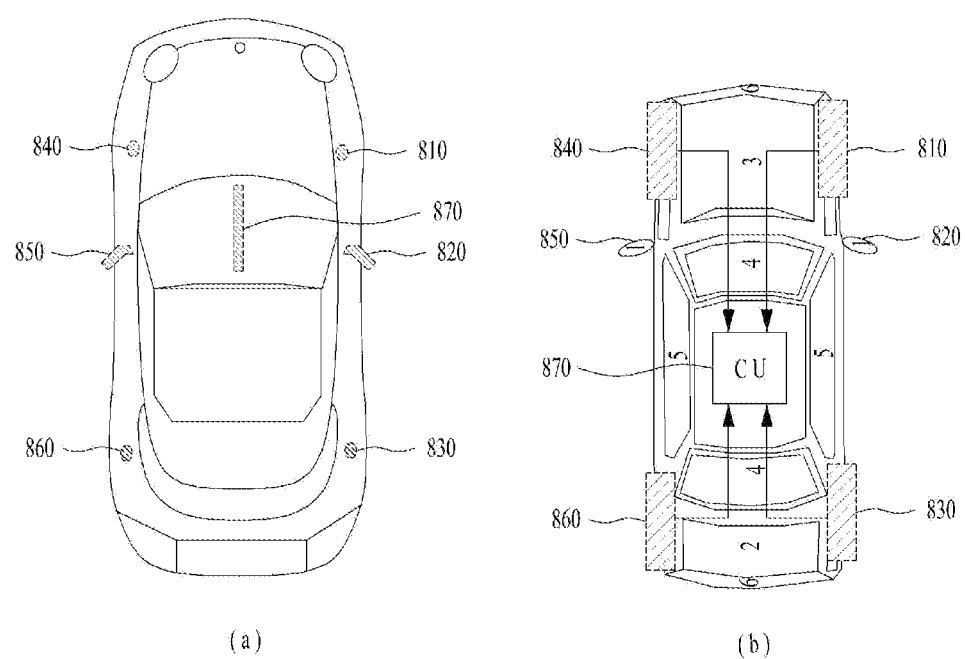
FIG. 15 is a view illustrating a vehicle that includes a distributed antenna panel in accordance with one embodiment of the present disclosure.

FIG. 15 is a diagram illustrating a vehicle equipped with distributed antenna panels according to an embodiment of the present disclosure. The above-described wireless communication system is used more frequently in a wider range of services. Unlike the existing static services, there is a growing need to support high quality of service (QoS) along with a high data throughput or a high data rate to a UE or a user moving at a high speed.

However, the existing wireless communication systems may have limitations in providing services to a UE in consideration of fast movement or mobility. To support the services, a system network needs to be improved to the level of revolution. Further, it may be necessary to design a new system within a range that does not affect the existing network infrastructure, while maintaining compatibility with the existing network infrastructure.

For example, a plurality of antenna panels (beams, antenna ports, transceiver units (TXRUs), or antenna elements) may be installed in a vehicle related to a UE, so that a service may be supported for the UE during fast movement. In the vehicle, a central unit (CU) may collect data received at each of the plurality of antenna panels or information for channel state measurement from each of the plurality of antenna panels. For this operation, a MIMO system between vehicles may be considered. When a plurality of antenna panels (beams, antenna ports, TXRUs, or antenna elements) are used as described above, the vehicle may prevent the degradation of communication performance caused by a transmission loss having an average value of about 20 dB. In addition, the vehicle may be equipped with a plurality of antenna panels (beams, antenna ports, TXRUs, and or antenna elements) attached thereto, and achieve reception diversity by spacing Rx antennas from each other. That is, it may be possible to provide a service to a UE during fast movement through the above-described inter-vehicle MIMO system, without an additional design for a network.

However, despite the above-described advantages, it is difficult to apply an inter-vehicle MIMO system for such reasons as appearance of the vehicle and construction of a manufacturing system. Moreover, the vehicle is considerably expensive compared to the existing personal portable communication devices, and is not easily improved or updated. Further, since a vehicle is equipment that should satisfy more requirements such as design concept, aerodynamic structure, and so on as well as communication performance, vehicle designs may be limited for aesthetic/aerodynamic reasons. For example, some vehicle manufacturers use a combination antenna, which is inferior in performance to a single antenna, in order to eliminate visual discomfort brought by an existing antenna.

However, to overcome the spatial constraints of large-scale antenna arrays in an environment requiring the development of communication systems, the installation of a distributed antenna array system for implementing a multi-antenna array system in a vehicle has been introduced and applied in consideration of harmony with the exterior of the vehicle.

Referring to FIG. 15, for example, a vehicle may be equipped with a plurality of antenna panels 810, 820, 830, 840, 850, and 860. The positions and number of the antenna panels 810, 820, 830, 840, 850, and 860 may vary depending on a vehicle design system and each individual vehicle. The configuration described below may be applied irrespective of the positions and number of the antenna panels 810, 820, 830, 840, 850, and 860, and the present disclosure is not limited to the following embodiment. That is, the configuration is applicable to antennas deployed in various shapes and radiation patterns according to the positions of the antenna panels 810, 820, 830, 840, 850, and 860.

A CU 870 may control signals for the antenna panels distributed in the vehicle. That is, the CU 870 of the vehicle may control signals to the plurality of antenna panels 810, 820, 830, 840, 850, and 860 installed in the vehicle to receive signals from a BS or other UEs, while maximizing reception diversity, and may prevent wireless disconnection from the BS or UEs during high-speed movement. That is, the vehicle itself may serve as one UE or a relay UE that relays signals, which has a plurality of antenna panels. The vehicle may provide a quality service to a plurality of UEs in the vehicle through control and relaying of received signals through the CU 870.

When wireless communication (or sidelink communication) is conducted through the plurality of antenna panels 810, 820, 830, 840, 850, 860 as described above, channel state information (e.g., a received signal strength indicator (RSSI), a reference signal received quality (RSRQ), a channel busy ratio (CBR), or a channel occupancy ratio) measured in specific resources may be different for each antenna panel. Specifically, the sensing (or/and measurement) results of the antenna panels (beams, antenna ports, TXRUs, or antenna elements) may be different due to self-blocking of the body of the UE (or vehicle), reflection between UEs (or vehicles), the angles of surfaces on which the antenna panels (beams, antenna ports, TXRUs, or antenna elements) are mounted, different radiation patterns, beamforming gains, or antenna gains due to different positions, or formation of beam directionalities. For example, for a vehicle at a specific location, the presence or absence of vehicle blockage may be determined differently for each antenna panel (beam, antenna port, TXRU, or antenna element) at a different position. Particularly, in the case that the UE provides a plurality of services by using a plurality of antenna units, a channel state varies depending on each antenna unit and beam quality also varies depending on requirements of each service, whereby a problem occurs in that a service suitable for requirements is not provided.

Hereinafter, when a plurality of services are provided using an antenna panel (or beam, AP, TXRU, or antenna element), a method for independently performing beam failure recovery for an antenna panel corresponding to each of the plurality of services will be described.

Service Specific Beam Failure Recovery and Radio Link Monitoring for V2X

The embodiments which will be described later propose methods for beam failure recovery (BFR), radio link monitoring (RLM), and/or radio resource management (RRM) by considering that link quality (or channel state), beamforming gain (or antenna gain), etc. may vary depending on beam (or antenna panel, baseband terminal (or digital beam), RF terminal (or analog beam), antenna port (AP), TXRU (transceiver unit) or antenna element) and requirements (reliability, latency requirements, etc.) may vary depending on a service type (or priority). Hereinafter, description will be given based on the assumption that RFR includes a series of operations related to RLM and RRM. The TXRU may be a unit having a phase shifter and an amplifier, which are related to analog beam control.

Next, V2X communication mode may be categorized into (1) a mode for signaling (or controlling) scheduling information related to V2X message transmission (or reception) on a V2X resource pool previously configured or signaled from the BS or the network, which is MODE #3, by means of the BS, and/or (2) a mode for directly determining or controlling scheduling information related to V2X message transmission (or reception) on a V2X resource pool previously configured or signaled from the BS or the network, which is MODE #4, by means of the UE. In this case, the UE located in communication coverage of the BS and/or the UE of RRC_CONNEECTED state may be set to the MODE #3, or the UE located outside communication coverage of the BS and/or the UE of IDLE state may be set to the MODE #4. Meanwhile, the MODE #4 may be set to even the UE located in communication coverage of the BS and/or the UE of the RRC_CONNECTED state.

For example, the term "sensing operation" may be interpreted as an operation of measuring PSSCH-RSRP based on a PSSCH-DMRS sequence scheduled by a successfully decoded PSCCH and/or an operation of measuring S-RSSI based on a V2X resource pool-related subchannel (see Table 2) in the present disclosure. The term "reception" may be interpreted (or extended) as at least one of (1) a V2X channel (or signal) decoding (or reception) operation and/or a WAN DL channel (or signal) decoding (or reception) operation, and/or (2) a sensing operation, and/or (3) a CBR measurement operation in the present disclosure. The V2X channel may include the PSCCH, the PSSCH, the PSBCH, and the PSSS/SSSS, and the WAN DL channel may include the PDCCH, the PDSCH, and the PSS/SSS.

In addition, the term "transmission" may be interpreted (or extended) as a V2X channel (or signal) transmission operation and/or a WAN UL channel (or signal) transmission operation in the present disclosure. The V2X channel may include the PSCCH, the PSSCH, the PSBCH, and the PSSS/SSSS, and the WAN DL channel may include the PUSCH, the PUCCH, and the SRS in the present disclosure. The term "synchronization signal (SS)" may be interpreted (or extended) as including "PSBCH" as well as "SLSS" in the present disclosure.

Table 1 describes an exemplary definition of a BWP and/or a carrier.

TABLE 1

Definition of bandwidth part
    A contiguous set of PRBs in a given numerology
Motivation of bandwidth part
    Energy saving by using RF switching
    Load balancing among different bandwidth part
    A single cell can support multiple UEs with different capability in terms of system
      bandwidth size
    Forward compatibility for potential extension of system bandwidth sizes
Bandwidth part in Rel-15
    A UE can support only one active DL BWP at a time for DL carrier in a cell
    A UE can support at most one active UL BWP in UL or UL and SUL or SUL only
      depending on SUL configuration
        In case SUL is not configured, at most one in UL carrier corresponding to the
          DL carrier
        In case SUL with dynamic switching is configured, at most one in each UL
          and SUL
        In case SUL is only used, at most one in SUL carrier

TABLE 1-continued

Figure 16:
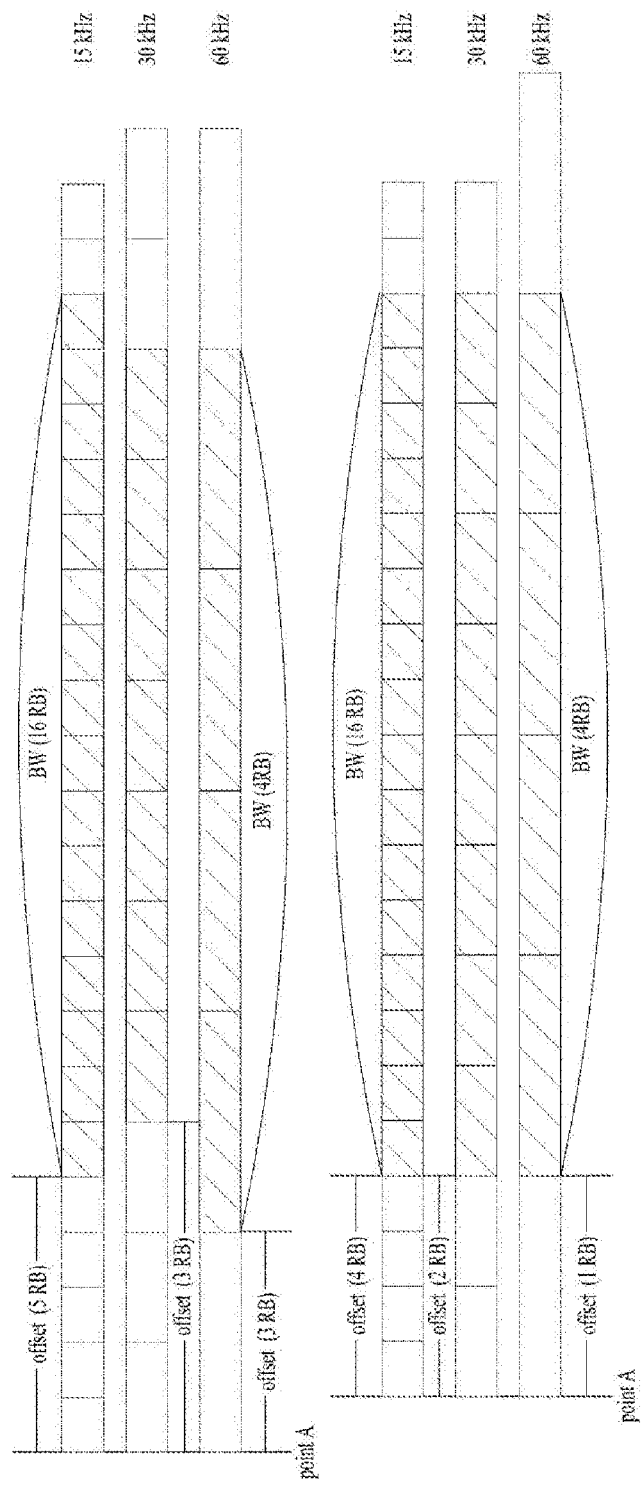
FIG. 16 is a view illustrating definition of a carrier in the present disclosure.
Figure 17:
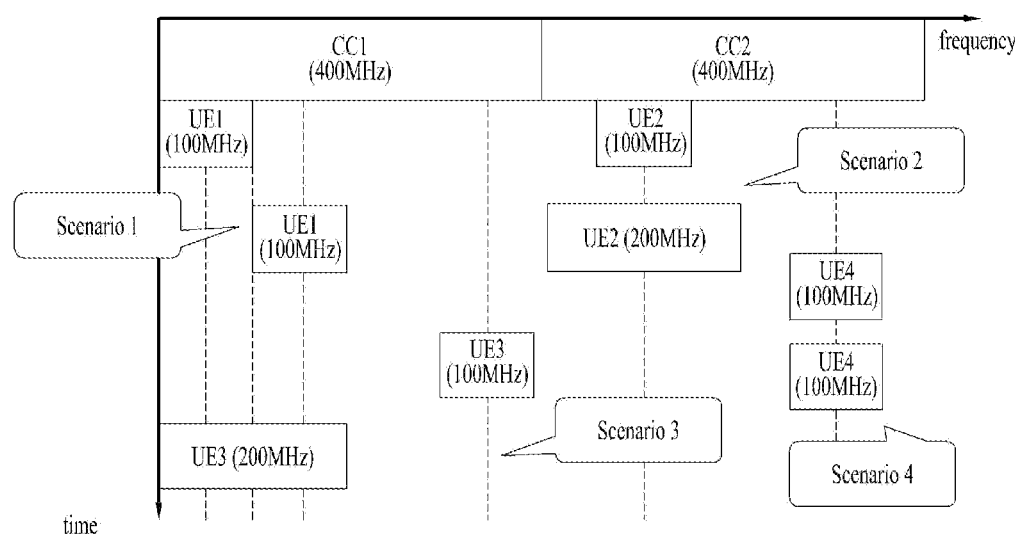

A UE expects the same numerology between DL BWP and UL BWP at the same time
in a given cell except for UL BWP in SUL carrier
    SUL carrier can support different numerology from DL carrier in the cell
    The numerology is however smaller or equal to that of DL carrier
A UE is configured or accessed initial DL/UL BWP for each cell
    Initial DL/UL BWP defines the first BWP that the UE access in a given cell
    In PCell, initial DL/UL BWP is defined by SSB & RMSI configuration
    In other cell, initial DL/UL BWP can be configured
Definition of carrier (See FIG. 16)
    Center frequency and bandwidth
    Subcarrier spacing(s) supported by the carrier are also indicated for a given carrier
    Parameters configured in each cell/carrier includes
        Point A: Reference point outside of carrier's PRBs where subcarrier 0 of all
          numerologies (supported by the network in that carrier) are aligned
        Offset between point A and lowest subcarrier for a given subcarrier spacing:
          the lowest frequency of PRBs of the given numerology (in RBs based on the
          given numerology)
        Bandwidth in # of RBs: bandwidth of the given numerology PRBs
Relationship between carrier and bandwidth part
    Configurations done at carrier level
        PRB grid of each numerology supported by the carrier
        BWP configurations (up to 4) in that carrier (DL/UL separate)
        CBG configuration
        TPC (per cell group)
        HARQ process
        Scrambling/sequence related parameters
    Configurations done at BWP level
        Control resource set (configured per cell, but association per BWP)
        Resource allocation related parameters (T/F) & DM-RS config
        CSI-RS related parameters
        SRS resource set
        HARQ-ACK & SR resource
        Configured UL grant
BWP Switching latency (See FIGS. 17 and 18)
    Type 4 UE-capability to indicate between Type1 and Type2 delay that the UE
      supports
    Scenario 4 does not require 'RF component latency'
Active Bandwidth part
    UE is not required to monitor the downlink radio link quality in DL BWPs other than
      the active DL BWP on the primary cell
    UE is not expected to receive PDCCH, PDSCH, or CSI-RS (except for RRM) outside
      an active DL BWP
    UE is not expected to be triggered with a CSI report for a non-active DL BWP
    UE is not expected to transmit PUCCH, or PUSCH outside an active UL BWP
    For a given time, a single BWP is active per link (DL/UL/SUL) per cell
    DCI format 1_1 and DCI format 0_1 can have bandwidth part indicator for dynamic
      change of DL/UL BWP for PDSCH/PUSCH transmission
        For each DCI field, the bit field size is determined based on the active DL
          BWP where PDCCH is transmitted, and the interpretation is based on the
          BWP indicated by DCI format 1_1 or 0_1
Initial Bandwidth part
    For DL, initial BWP is given by consecutive RB sets for RMSI CORESET (which is
      configured by PBCH)
    Subcarrier spacing,
    CP length,
    For UL, initial BWP is given by SIB for random access procedure
Default Bandwidth part
    Default DL bandwidth part is higher layer configured
    Initial value of default bandwidth part is initial DL bandwidth part
    For energy saving, UE will switch its active bandwidth part to default bandwidth part
      when UE does not detect DCI format 1_1 or DCI format 0_1 for a certain duration of
      time (based on BWP-InactivityTimer)

Table 2 describes an exemplary definition of S-RSRP and/or S_RSSI and/or CBR and/or CR.

TABLE 2

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |

TABLE 2-continued

| | |
|---|---|
| Applicable for | RRC_IDLE intra-frequency,<br>RRC_IDLE inter-frequency,<br>RRC_CONNECTED intra-frequency,<br>RRC_CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

NOTE: The power per resource element is determined from the energy received during the useful part of the symbol, excluding the CP.

5.1.30 Channel busy ratio (CBR)

| | |
|---|---|
| Definition | Channel busy ratio (CBR) measured in subframe n is defined as follows:<br>For PSSCH, the portion of sub-channels in the resource pool whose S-RSSI measured by the UE exceed a (pre-)configured threshold sensed over subframes [n − 100, n − 1];<br>For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two consecutive PRB pairs in the frequency domain. |
| Applicable for | RRC_IDLE intra-frequency,<br>RRC_IDLE inter-frequency,<br>RRC_CONNECTED intra-frequency,<br>RRC_CONNECTED inter-frequency |

NOTE: The subframe index is based on physical subframe index 5.1.31 Channel occupancy ratio (CR)

| | |
|---|---|
| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n + b]. |
| Applicable for | RRC_IDLE intra-frequency,<br>RRC_IDLE inter-frequency,<br>RRC_CONNECTED intra-frequency,<br>RRC_CONNECTED inter-frequency |

NOTE 1: a is a positive integer and b is 0 or a positive integer; a and b are determined by UE implementation with a + b + 1 = 1000, a >= 500, and n + b should not exceed the last transmission opportunity of the grant for the current transmission.
NOTE 2: CR is evaluated for each (re)transmission.
NOTE 3: In evaluating CR, the UE shall assume the transmission parameter used at subframe n is reused according to the existing grant(s) in subframes [n + 1, n + b] without packet dropping.
NOTE 4: The subframe index is based on physical subframe index.
NOTE 5: CR can be computed per priority level Table 3 below describes an exemplary beam failure recovery (BFR), radio link monitoring (RLM), and/or L3 measurement (or radio resource management (RRM)) procedure.

TABLE 3

Beam failure recovery
    Motivation
        Frequent radio link failure can be occurred in FR2 operation due
            to the analog beamforming based communication
            A serving beam pair is vulnerable to UE mobility, UE
                rotation, or beam blockage
            Radio link recovery takes too long time until the link is
                successfully recovered TABLE 3-continued If UE can find a new beam based on periodic DL RS
            measurement, the link can be quickly recovered via
            changing the serving beam
    Define a new L1/L2 based fast link recovery procedure
        (UE-initiated serving beam change)
    Overall procedure
        Beam failure detection
            UE finds out whether serving DL beam is failed or not
        New beam identification
            UE finds out a new beam based on beam RS strength
            and selects an
            associated PRACH preamble
        BFRQ(beam failure recovery request) & monitoring response
            from gNB
            UE transmits the selected PRACH and searches for
                gNB's response TABLE 3-continued Beam failure detection
  A beam failure instance
    When BLERs of all serving beams are above a
      threshold($Q_{out}$), it is called as a beam failure
      instance (BFI)
    For 'serving beam' RS determination,
      Option 1: No explicit configuration of
      failure-detection-RS
        All of the CORESET beam RSs (CSI-RS or
        SS/PBCH block) are monitored
      Option2: Explicit configuration of failure-detection-RS
        The configured RS(s) are monitored
        Only periodic CSI-RS with single port is allowed to
        be configured
    PHY reports BFI to MAC sublayer periodically
      No BFI indication if the BLER is below the
        threshold ($Q_{out}$)
      The indication interval is determined by the shortest
      periodicity of failure-detection-RSs
      The interval is lower bounded by 2 msec
    'Bam failure' is declared if N BFIs are occurred, where
    consecutive BFIs should be occurred within a timer.
      If no BFI is received during M reporting intervals, MAC
      resets the BFI count.
      The value of N (max. BFD count) and M (BFD timer)
      are configured by RRC.
New beam identification and PRACH Tx
  NW can configure a list of new candidate beam RSs and a list
    of associated contention-free (CF) PRACH resources to a UE
    by RRC
      Case1(1-1 mapping): a CF PRACH - an SSB ID
      Case2(1-1 mapping): a CF PRACH - a CSI-RS resource
      ID
      Case3(1-1 mapping): a CF PRACH - either an SSB ID or a
      CSI-RS resource ID
      Case4(1-X mapping): a CF PRACH - a SSB ID and
      sQCLed CSI-RS resource ID(s)
  When beam failure event occurs, UE selects a beam RS (either
    SSB or CSI-RS) and transmits PRACH associated to the
    selected RS
    When the new beam RS list is configured, UE searches for
      a new beam among the configured RSs first until a timer
      (Beam-failure-recovery-Timer) expires.
      If UE found at least one beam RS above a L1-RSRP
        threshold ($Q_{in}$),
        UE selects one of the RS(s) and transmits CF
        PRACH mapped to the selected one
      Else, UE searches for all SSBs & selects one SSB
        among them, and then transmits contention-based
        PRACH associated to the selected SSB
        If at least one SSB is above a L1-RSRP threshold,
        UE selects one of the SSB(s)
        Else, UE selects any SSB
    After the timer expiration, UE searches for a SSB and
      transmits contention-based PRACH associated to the SSB
      selected by UE
    When the new beam RS list is not configured, UE searches
      for a SSB and transmits contention-based PRACH
      associated to the SSB selected by UE
  If UE could not receive a response for the PRACH within
    a window,
    UE can select another new beam and can transmit the
    PRACH associated to the beam
  UE stops the PRACH transmission if the number of PRACH
    transmissions reaches to the maximum number
    (PreambleTransMax-BFR) configured by RRC
PRACH response monitoring
  If gNB successfully detects the PRACH, it means that
    The UE is in 'beam failure'and a new beam is found by
    the UE
    The new beam ID or a set of potential new beam IDs
    is the one(s) associated to the PRACH
  gNB can transmit a PDCCH as a response to the PRACH
    for BFRQ
    For the response reception w.r.t. the CF PRACH,
      CRC of the PDCCH is scrambled by C-RNTI
      No restriction on the DCI format
      A dedicated search space for the response monitoring can
      be configured by RRC
      UE starts monitoring after 4 slots of the PRACH
      transmission
    For the response reception w.r.t. the CB PRACH, existing
      search space & related parameters for initial access
      is reused
    UE assumes that the PDCCH for BFRQ response is
      spatial QCL'ed with DL RS of the UE-selected new beam
      for the BFRQ
L3 Measurement for mobility management
  Measurement resources for RRM measurement
    LTE system
      Common Reference Signal is defined as "Always-On" signal
      CSI-RS within DMTC window (Small cell enhancement)
    NR system
      No "Always-On" reference signal
      Multi-beam operation
  Measurement Resource for RRM measurement in NR
    Measurement resource
      SS/PBCH block : SSS and PBCH-DMRS
      CSI-RS within active BWP (only in connected mode)
    SS/PBCH block based measurement is baseline
      SS/PBCH block: Always periodic transmission
      CSI-RS : No self-synchronization property
    SMTC (SSB-based RRM measurement Timing configuration)
      Similar to DMTC in LTE system
    Network power saving vs. UE complexity
      Long periodicity of SS/PBCH block for network power
        saving : maximum 160 ms
      High complexity of neighbour cell detection in UE from long
        periodicity
    UE power saving
      SS/PBCH blocks from neighbour cells are confined within
        the configured window
        Configured window = SMTC
        Comparable complexity of neighbour cell searcher to
        LTE system
    Measurement subset
      Network configuration of subset of SS/PBCH blocks
  Configuration
    SMTC window duration
    SMTC periodicity & timing offset
    Multiple SMTC (periodicity) configuration :
    SMTC1/SMTC2
    Common window duration and timing offset for SMTC1
    and SMT2
    Cell list in SMTC2 in case of multiple periodicity
    configuration
  CSI-RS resources
    Why CSI-RS resources?
      Large number of transmission beam in a cell
      Lighter resources than SS/PBCH block
      More flexible resource configuration
    Associated SS/PBCH block & QCL
      UE is required to measure all configured CSI-RS resources
        Large measurement capability & power consumption
      Associated SS/PBCH block for UE complexity reduction
        UE measurement: Only when the associated SS/PBCH
        block is detected
        QCL (Type-D) configuration with the associated SS/PBCH
        block resource
    Reference timing of CSI-RS Resource
      Associated SS/PBCH block - Timing of the detected cell
      No associated SS/PBCH block : Timing of the serving cell
  Measurement report
    Per-cell measurement report
      If absThreshSS-BlocksConsolidation is not configured
      or the highest beam measurement quantity value is
      below absThreshSS-BlocksConsolidation
        Highest beam measurement quantity value
      else
        The linear average of the power values of the highest beam
        measurement quantity values above absThreshSS-
        BlocksConsolidation where the total number of averaged
        beams shall not exceed nrofSS-BlocksToAverage
    Per-beam measurement report
    Per-beam measurement report
      Detection of SSB index for per-beam measurement report
        High UE complexity for extraction of SSB index from PBCH TABLE 3-continued Synchronization indicator (UseServingCellTimingForSync)
    Use timing of one cell to derive the SSB index of another
    cell
        Intra-frequency measurement : serving cell
        Inter-frequency measurement : any detected cell
    In TDD bands, Synchronization indicator is assumed to
    be set to TRUE
RSRP
    Used for Beam management and mobility (cell selection,
    reselection and handover)
    SS/PBCH block RSRP and CSI-RS RSRP
        SS-RSRP : linear average over the power contributions
        (in [W]) from SSS and PBCH DM-RS in Idle,
        inactive, connected mode
        CSI-RS RSRP : linear average over the power contributions
        (in [W]) from CSI-RS in connected mode
RSRQ
    Used for mobility (cell selection, reselection and handover)
    Secondary synchronization signal reference signal received quality
    (SS-RSRQ)

$$\frac{N \times SSB\ RSRP}{NR\ \text{carrier}\ RSSI},$$

where N is the number of RB's of the NR carrier RSSI
        measurement bandwidth.
    CSI reference signal received quality (CSI-RSRQ)

$$\frac{N \times CSI - RSRP}{CSI - RSSI},$$

where N is the number of resource blocks in the CSI-RSSI
        measurement bandwidth
RSSI
    Linear average of the total received power (in [W]) observed only
    in OFDM symbols of measurement time resource(s)
        Including co-channel serving and non-serving cells, adjacent
        channel interference, thermal noise etc.
    Measurement duration
        SS/PBCH block
            Default configuration
                SS/PBCH block : Any OFDM symbols within
                SMTC window (UE implementation)
            Network configuration
                Avoid UL part (and/or SS/PBCH block) for RSSI
                measurement in TDD band
                Measure over the indicated OFDM symbols of the
                indicated slots
        CSI-RS : OFDM symbol containing CSI-RS resources
    Rx beam for RSRQ measurement
    Same set of RX beams shall be used in measurement of
    each TX beam based on a measurement object
    Same Rx beam between RSRP measurement and RSSI
    measurement
Radio Link Monitoring for mobility management
    Overview
        Objective
            Detection of the downlink radio link failure (RLF)
            of the PCell and PSCell
            Periodic IS (In sync)/OOS (Out of sync)
            indication to RRC layer
            Radio link re-establishment after RLF
        Reference channel
            Same with LTE
            Hypothetical PDCCH (BLER)
        Measurement resources
            SS/PBCH block and/or CSI-RS
                Explicit configuration from network
                Default RLM-RS : RSs indicated by TCI state of
                CORESETs for monitoring PDCCH
            Configurable $Q_{in}/Q_{out}$ for service type (RAN4)
    Multiple beam operation in RLM
        Multiple RLM-RS configuration for multiple beam
        IS/OOS definition
            OOS : when the radio link quality is worse than the
            threshold $Q_{out}$ for all resources in the set of resources
            for radio link monitoring TABLE 3-continued IS : when the radio link quality is better than the
            threshold $Q_{in}$ for any resource in the set of resources
            for radio link monitoring
    Beam failure and RLM
        Beam failure also use hypothetical PDCCH BLER
        Radio link monitoring : Potential cell-level link quality
            Concept : Monitoring all possible beams from gNodeB
            Maximum number of RLM-RS resources due to UE
            complexity
                2 for below 3 GHz/4 for 3~6 GHz/8 for above
                6 GHz
        Beam failure : Actual beam-level link quality
            Default resource : TCI-state of CORESET that UE is
            configured for monitoring PDCCH BFR (BEAM-FAILURE-RECOVERY) Operation According to the NR specifications (see Table 3), when communication between the BS and the UE is performed, the UE may regard that "beam failure instance (BFI)" has occurred if a block error ratio (BLER) of every serving beam is higher than a threshold value QOUT. If the BFI occurs within a preset timer (for example, M report intervals) continuously N times, "beam failure" may be declared. In this case, a timer value (or beam failure detection timer, M) and the value of N (or MAX BEAM FAILURE DETECTION COUNT) may previously be set from the network. Also, the BEAM BLER may be obtained in the form of "HYPOTHETICAL PDCCH BLER" in the same manner as the case of RLM (Radio Link Monitoring). In this case, FAILURE-DETECTION RS of the beam may previously be configured. Alternatively, when a BEAM FAILURE EVENT occurs, "new beam RS list information" which will be discovered and/or measured and "CONTENTION-FREE (CF) PRACH RESOURCE list information linked to the new beam RS list information (or linked per beam RS or beam RS set)" may previously be configured (or may previously be configured by the network). These operations may be a series of operations related to beam failure recovery (BFR).

Otherwise, when a BEAM FAILURE EVENT occurs, the UE may select beam RS (or new beam RS) and transmit PRACH linked to the selected beam RS. Otherwise, in the case that new beam RS list information is configured, the UE may discover and/or measure new beam until a beam failure recovery timer (BEAM-FAILURE-RECOVERY-TIMER) (which is previously set) expires within the corresponding beam RS list. In this case, if at least one beam RS having a measurement value higher than "(previously set) L1-RSRP threshold value QIN" exists within the new beam RS list, the UE may select one beam RS (BEAM RS) among the beam RSs and transmit CF PRACH linked to the selected beam RS. If not so, after discovering/measuring all SSBs (SYNCHRONIZATION SIGNAL/PBCH BLOCKs), the UE may select one SSB among them and transmit CONTENTION-BASED (CB) PRACH linked to the selected SSB. Otherwise, if at least one SSB having a measurement value higher than "(previously set) L1-RSRP threshold value QIN" exists, the UE may select one SSB among them, and if not so, the UE may randomly one SSB. Otherwise, if the beam failure recovery timer (BEAM-FAILURE-RECOVERY-TIMER) expires, the UE may select one SSB after discovering/measuring the SSBs and transmit CB PRACH linked to the selected SSB. Otherwise, in the case that new beam RS list information is not configured, the UE may select one SSB after discovering/measuring SSBs, and may transmit CB PRACH linked to the selected SSB.

Otherwise, in the case that a PRACH RESPONSE is not received within a preset time window, the UE may select another new beam (or new beam RS) and transmit PRACH linked to the selected beam. Otherwise, if PRACH transmission reaches "preset maximum PRACH transmission times (PREAMBLETRANSMAX-BFR)", the UE may stop such PRACH transmission.

According to the NR specifications, when MULTIPLE BEAM OPERATIONs are performed, RLM may be managed in accordance with the following rules. In detail, MULTIPLE RLM-RSs may be configured for MULTIPLE BEAMs. If radio link quality (that is, HYPOTHETICAL PDCCH BLER) of all resources within a resource set configured for RLM is less than a threshold value QOUT, it may be defined as "OUT-OF-SYNCH (OOS)", whereas if RADIO LINK QUALITY of at least one resource is better than a threshold value QIN, it may be defined as "IN-SYNCH (IS)".

Also, in the case that BFR/RLM is managed based on a common reference without consideration of requirements (for example, RELIABILITY, LATENCY, etc.) different per service type (or priority) when a plurality of service related communications are performed, it is difficult to obtain optimal performance per service. Therefore, a method for solving this problem is required.

In detail, in the case that two service communications are supported using four beams, for service #A of high RELIABILITY REQUIREMENT, BEAM #0 and 1 having relatively great beamforming gain (or antenna gain) or relatively good link quality (or channel state) may be used. For service #B of low RELIABILITY REQUIREMENT, BEAM #2 and 3 having relatively small beamforming gain (or antenna gain) or relatively low link quality (or channel state) may be used. In this case, if BFI related threshold QOUT is focused on (or biased on) service #B, even in the case that service #A communication continues to be failed, BFI counting and BFR procedure may not be performed properly.

Meanwhile, in the case that transmission of the same or different messages is performed through a plurality of antenna panels (or beams, TXRUs or antenna elements) into which AP indexes are mapped, the message transmission may be defined as a kind of multi-layer transmission, wherein some or all of the AP indexes are different. Also, in the case that message transmission is performed through a plurality of antenna panels (or beams, TXRUs or antenna elements) into which the same AP index is mapped, the message transmission may be defined as a kind of SINGLE-LAYER transmission.

Moreover, the proposed method of the present disclosure may be limited to TX operation (CARRIER/BWP selection of TX and/or CARRIER/BWP selection of RX). In the present disclosure, the term "configuration (or definition or designation)" may be enlargedly interpreted as "signaling (from the network) (or (PRE)CONFIGURATION)". The terms "beam", "antenna panel", "AP (or BASEBAND terminal/digital beam AP or RF terminal/analog beam AP)", "TXRU", and "antenna element", which are described in the present disclosure, may be mutually extended/cross-interpreted. In the present disclosure, the terms "beam", "antenna panel", "AP", "TXRU", and "antenna element" may be enlargedly interpreted as (preconfigured) "beam set", "antenna panel set", "AP set", "TXRU set", and "antenna element set", respectively. In the present disclosure, the term "antenna panel" may be interpreted as a unit comprised of one or more (preconfigured) "beams", "APs", "TXRUs" or "antenna elements".

Also, in the present disclosure, the term "RSRP" may be mutually and enlargedly interpreted as "(SIDELINK or SUB-CHANNEL) RSSI" or "(SIDELINK or PSSCH) RSRQ". Also, in the present disclosure, the term "PSSCH" may be mutually and enlargedly interpreted as "PSCCH" as an example.

BFR Parameter Configuration Per Service

According to the first embodiment, for each of service types (or priorities) having different requirements and/or beam (or antenna panel, AP or TXRU), all or some of the following parameters may be configured independently (or operation may be managed independently). In this case, for each of the service types (or priorities) having different requirements, or beam (or antenna panel, AP, antenna element or TXRU), or beam (or antenna panel, AP or TXRU) for which service communications of different requirements are performed (or mapped), at least one of BFI declaration/counting, determination as to whether to exceed QIN/QOUT BLER threshold value, OOS/IS determination, BEAM FAILURE declaration, BFR procedure triggering/implementation, RLM operation, RADIO LINK FAILURE (RLF) declaration/recovery and RRM operation may be interpreted to be implemented or performed independently.

In this case, as an example of the case to which the first embodiment is applied, BFI related to an antenna panel, of which BLER for every serving beam exceeds a threshold value QOUT, may be declared/counted. Also, in case that the first embodiment will be applied, a beam failure (or RLF) declaration reference of beam (or antenna panel, AP or TXRU) for providing a service of a (relatively) high priority (or PPPR) (or service of (relatively) low PPPP) may be more alleviated than beam (or antenna panel, AP, antenna element or TXRU) for providing a service of a (relatively) low priority (or service of (relatively) high PPPP), whereby a prompt BFR procedure (or RLF recovery operation) may be performed. Also, the proposed methods of the present disclosure may be applied to each of different PPPPs (or PPPRs) or beam (or antenna panel, AP, antenna element or TXRU) into which different PPPPs (or PPPRs) are mapped.

In this case, the rules according to the first embodiment may be valid especially for the case that services having different requirements are categorized into PPPP (PROSE PER-PACKET PRIORITY) or PPPR (PROSE PER-PACKET RELIABILITY), or traffic priority related to service. For example, the lower PPPP value may mean a service of (relatively) high priority (or the higher PPPR value may mean a service of high priority or a service of relatively high priority).

In this case, the BFI determination related BLER threshold value $Q_{OUT}$ may be set to be low (or relatively low) for a service of relatively high requirements (or reliability). For example, when it is determined that link quality of beam (or antenna panel, AP, antenna element or TXRU), for which service communication of relatively high traffic requirements (or traffic reliability) is performed, fails to stably support a corresponding service, BFI declaration/counting may promptly (or properly) be performed. Alternatively, a failure detection RS (FAILURE-DETECTION RS) or beam failure detection RS for obtaining beam BLER acquisition may be used.

Also, BEAM FAILURE is declared when BFI occurs within a preset timer (for example, M REPORTING INTERVALs) consecutively N times. Regarding the beam failure declaration, a value of N and/or M may be set as follows. The value of N (and/or M) may be set to a (relatively) small value for a service of relatively high requirements (or reliability requirements). For example, when it is determined that link quality of beam (or antenna panel, AP, antenna element or TXRU), for which service communication of relatively high requirements (or reliability requirements) is performed, fails to stably support a corresponding service, BFR procedure may promptly (or properly) be triggered or performed.

When BEAM FAILURE EVENT occurs, 'a timer value for new beam detection/measurement (BEAM-FAILURE-RECOVERY-TIMER)', '(new) beam RS list for which discovery/measurement will be performed', 'L1-RSRP threshold value ($Q_{IN}$) for selectable (new) beam (set) selection', 'channel resource (NBINDI_CH) transmitted to notify newly selected beam information', 'maximum times/allowance value of (newly discovered BEAM related) NBINDI_CH transmission (or maximum times/allowance value of NBINDI_CH transmission related to newly discovered beam)', and/or 'a time window length in which a response message to NBINDI_CH transmission may be received' may be set. Meanwhile, in the NBINDI_CH, mapping between a channel resource and beam (or beam index) may previously be defined.

The corresponding L1-RSRP threshold value ($Q_{IN}$) may be set to allow the service of relatively high requirements (or reliability requirements) to be high (or relatively high). For example, the corresponding L1-RSRP threshold value may allow beam (or antenna panel, AP, antenna element or TXRU) of link quality, which may satisfy relatively high requirements (or reliability requirements), to be properly selected and also prevent BFR procedure triggering/implementation (or BFR procedure triggering/implementation) for a corresponding service from frequently occurring.

OOS (OUT-OF-SYNCH) determination related QOUT BLER threshold value and/or IS determination related QIN BLER threshold value may be set. For example, in case of a service having relatively high requirements (or reliability requirements), the $Q_{OUT}$ BLER threshold value may be set to be low (or relatively low), and the $Q_{IN}$ BLER threshold value may be set to be high (or relatively high).

Otherwise, RLM-RS for obtaining a beam BLER may previously be configured. Otherwise, RRM measurement RS and/or resource may previously be configured. Otherwise, whether to obtain RRM measurement value (or RRM reporting value) by linear averaging beam measurement values (BEAM MEASUREMENT QUANTITY) of a preset threshold value or more or determine the highest beam measurement value of the BEAM MEASUREMENT QUANTITY as the RRM measurement value may previously be set.

Signaling of BFR Configuration Information or Service Mapping Information (MAP_BMSV) Per Beam As the second embodiment, configuration information on some or all of the parameters (or operation) per service type, priority, PPPP, PPPR, or beam (or antenna panel, AP, antenna element, or TXRU) may previously be configured from the network, or may be signaled by a UE to another UE (or another UE that performs communication with the above UE) through a predefined channel (for example, PSBCH). For example, failure detection (FAILURE-DETECTION) RS information (or beam failure detection RS information), beam RS list (or new RS list) information for discovery/measurement, NBINDI_CH information (or NBINDI_CH information linked per beam, NBINDI_CH information linked per beam index), RLM-RS information, RRM measurement RS information, etc. may be shared through at least the latter method (that is, signaling method of a UE to another UE).

As the third embodiment, in the case that some or all of beams (or antenna panels, APs, antenna elements, or TXRUs) linked per service type, priority, PPPP or PPPR are different, for example, service mapping information (MAP_BMSV) per beam may be shared/signaled to another UE or BS through a preconfigured channel/signal in the following method. Meanwhile, the MAP_BMSV sharing/signaling through PSBCH will be described but is not limited to the PSBCH, and the MAP_BMSV sharing/signaling may be performed through another channel/signal (e.g., PSCCH, PSSCH, PSSS/SSSS, etc.).

Otherwise, MAP_BMSV may be used or substituted as an input parameter for DMRS sequence initialization of the PSBCH (or PSBCH transmitted per beam, antenna panel, AP or TXRU). For example, according to the aforementioned method, service type, priority, PPPP or PPPR information mapped into PSBCH transmission beam (or antenna panel, AP, TXRU, or antenna element) may be identified by PSBCH DMRS sequence detection only.

Otherwise, MAP_BMSV may be included in payload of the PSBCH. For example, in this case, after completing PSBCH decoding based on the MAP_BMSV, service type, priority, PPPP and/or PPPR information mapped into the PSBCH transmission beam (or antenna panel, AP, TXRU, or antenna element) may be identified.

As the fourth embodiment, if beam failure event (or BEAM RLF EVENT) occurs, the UE (or receiving UE) may notify a transmitting UE of beam (or antenna panel, AP, antenna element or TXRU) information, service type (or priority, PPPP or PPPR) information, and/or RSRP (or RSRQ, BLER, HYPOTHETICAL PDCCH BLER) information, which are related to the beam failure event, through a predefined channel Method for Performing BFR Between Multiple Services of Different Requirements As the fifth embodiment, when multiple service communications of different requirements are performed, in accordance with "the parameter (or operation) of the first embodiment" related to the service (or preconfigured service) of relatively high (or low) requirements, a beam failure declaration/recovery (or RLF) for a whole (or preconfigured) service (or beam, antenna panel, AP, antenna element or TXRU) may be defined to be implemented.

Also, if beam failure (or RLF) for at least one (or all or preconfigured) service (or beam or antenna panel, AP or TXRU) is declared when multiple service communications of different requirements are performed, a beam failure recovery (BFR) procedure (or RLF recovery procedure) for a whole (or preconfigured) service (or beam, antenna panel, AP or TXRU) may be defined to be performed.

As the sixth embodiment, beams (or antenna panels, APs, antenna elements or TXRUs) may be categorized into two or more sets based on priority of a service, whereby a beam failure recovery (BFR) procedure (or RLF recovery procedure) may be defined. For example, a beam (or beam, antenna panel, AP, antenna element or TXRU) set A (SET A) used by a service of (relatively) high priority (or PPPR) (or a service of (relatively) low PPPP) and a beam (or antenna panel, AP, antenna element or TXRU) set B (SET B) used by a service of (relatively) low priority (or PPPR) (or service of (relatively) high PPPP) may exist. At this time, in the case that a beam failure recovery (BFR) operation (or RLF recovery operation) of the SET A is performed, performance of the SET B may be deteriorated, and a tolerance level of the performance deterioration is defined as "TL#B". Also, performance of the SET A is (unavoidably) deteriorated to perform a beam failure recovery (BFR) operation (or RLF recovery operation) of the SET B, and in this case, a tolerance level of the performance deterioration may be defined as "TL#A". In this case, if asymmetric control where TL#A and TL#B are different from each other is performed, it may assist performance of the service of (relatively) high priority (or PPPR) (or service of (relatively) low PPPP) to be maintained to the maximum. For example, if "TL#B=INFINITY" and "TL#A=0" are set, it may prevent the beam failure recovery (BFR) operation (or RLF recovery operation) of the SET B used by the service of (relatively) low priority (or PPPR) (or service of (relatively) high PPPP) from affecting performance of the service of (relatively) high priority (or PPPR) (or service of (relatively) low PPPP) and at the same time allow the beam failure recovery (BFR) operation (or RLF recovery operation) of the SET A used by the service of (relatively) high priority (or PPPR) (or service of (relatively) low PPPP) to be performed by using available resources to the maximum without consideration of performance of the service of (relatively) low priority (or PPPR) (or service of (relatively) high PPPP).

As the seventh embodiment, (in accordance with the above-described rules or some rules), if beam (or antenna panel, AP, TXRU, or antenna element) newly selected after BFR (or RLF recovery) procedure is performed is the same as before (and/or if a corresponding event is repeated as much as preset times), a reference for beam failure (or RLF) declaration (or BFR procedure triggering/implementation or RLF recovery operation implementation) may be alleviated (for example, parameter value control according to the first embodiment), or beam failure (or RLF) declaration (or BFR procedure triggering/implementation or RLF recovery operation implementation) may (temporarily) be stopped (for example, the existing beam (or antenna panel, AP, antenna element or TXRU) may be maintained).

Also, for example, the BFR (or RLF recovery) procedure (based on the above-described rules or some rules) may be defined to be restrictively performed only if beam (or antenna panel, AP, antenna element or TXRU) of link quality (or channel state) relatively better than the existing link quality or beam (or antenna panel, AP, antenna element or TXRU) of beamforming gain (or antenna gain) relatively better than the existing beamforming gain exists.

BFR Related Reference Signal (RS)

As the eighth embodiment, the UE may transmit (or may be set to transmit) a failure detection RS, or beam failure detection RS (or RLM-RS, measurement RS, or beam RS) in accordance with a preset period, or may transmit (or may be set to transmit) the corresponding RS at least K times within a preset time period, or may (aperiodically) transmit the RS based on its request (periodically or aperiodically transmit the RS based on UE request received through a predefined channel), or may transmit (or may be set to transmit) the failure detection RS, or beam failure detection RS (or RLM-RS, measurement RS, or beam RS) (with respect to another beam) when RS measurement value related to beam fed back and currently used is a preset threshold value or less. This failure detection related RS transmission may be used or configured for stability (/reliability) for determination of beam failure (or RLF) event occurrence (or beam (or antenna panel, AP, TXRU, or antenna element) management related measurement) or discovery/tracking operation for beam (or antenna panel, AP, TXRU, or antenna element). Meanwhile, for convenience of description, it is assumed that the BFR RS corresponds to at least one of failure detection RS, beam failure detection RS, RLM-RS and measurement RS.

In this case, the preset period or K value (or time period length) may be set differently (or set independently) per service type(/priority), PPPP, PPPR, beam (or antenna panel, AP, TXRU, or antenna element). Also, the BFR RS may be transmitted independently (for example, sensing and resource reservation for the aforementioned BFR RS transmission may be performed independently), or DMRS transmitted onto a data (/control) channel may be defined to be used for beam failure detection, etc., or may be transmitted together with a preconfigured channel (for a corresponding purpose of use) by being included on the preconfigured channel (for example, PSDCH, PSCCH, PSSCH, etc.) (or may be transmitted by being (restrictively) included during transmission of some or all of data and/or control channels). In this case, if the BFR RS is transmitted by being included on the data channel like the latter case, the BFR RS may be signaled on the control channel, and data may be subjected to RATE-MATCHING (or PUNCTURING) for the corresponding BFR RS. In this case, as an example, a transmission power of the BFR RS may previously be configured (from the network) per service type, priority, PPPP, PPPR, beam (or antenna panel, AP, TXRU, or antenna element), or a transmitting UE may signal the transmission power of the BFR RS to a receiving UE through a predefined channel. For example, a reception beam (or antenna panel, AP, TXRU, or antenna element) may be divided into its direction or geographical position and then managed to be suitable for PC5 communication.

In this case, in the case that the above-described rules are applied, signal (or BFR RS) may be received from various UEs, whereby efficient sample (measurement sample) acquisition may be enabled. For example, the receiving UE may perform quality measurement by averaging all RSs (or preconfigured RSs) received in a specific beam (or antenna panel, AP, TXRU, or antenna element) and/or channel/signal (for example, PSCCH, PSSCH). In the case that this rule is applied, quality measurement of reception beam only of transmitting/reception beams (or antenna panels, APs, TXRUs, or antenna elements) may be regarded to cause a problem. However, if the transmitting UE properly manages its reception beam (or antenna panel, AP, TXRU, or antenna element) by actively using channel reciprocity in PC5 communication and uses/applies the reception beam for/to the transmission beam (or antenna panel, AP, TXRU, or antenna element) by assuming channel reciprocity, the corresponding problem may be alleviated. For example, a beam (or antenna panel, AP, TXRU, or antenna element) management result may be shared between (specific) transmitting/receiving UEs, whereby reception beam (or antenna panel, AP, TXRU, or antenna element) quality and transmission beam (or antenna panel, AP, TXRU, or antenna element) quality may be summed (or averaged), or full beam (or antenna panel, AP, TXRU, or antenna element) quality may be evaluated by a minimum value (or maximum value) of reception beam (or antenna panel, AP, TXRU, or antenna element) quality and transmission beam (or antenna panel, AP, TXRU, or antenna element) quality.

For example, for discovery of an interested UE (or UE that provides an interested service) in case of unicast (and/or groupcast, multicast and/or broadcast) communication, channel/signal (for example, discovery channel/signal) to which related information (for example, UE identifier (e.g., SOURCE/DESTINATION L2 ID), service identifier (e.g., ITS APPLICATION IDENTIFIER (ITS-AID), PROVIDER SERVICE INDENTIFIER (PSID), etc.) is transmitted may be required. In this case, in the case that the existing channel/signal (for example, communication channel/signal) is reused for transmission of the aforementioned related information (without definition of a separate channel/signal), an indicator (or field) indicating a usage (for example, discovery or communication) of the aforementioned related information on the existing channel/signal (for example, PSCCH) may be defined. For example, in the case that the corresponding rule is applied (or in the case that the usage of the related information is indicated through the field or indicator), the usage of the received channel/signal may be determined by a lower layer (e.g., PHY/AS LAYER), and the UE may deliver the information on the received channel/signal to its higher layer only when a measurement value (or measurement value of DMRS on the corresponding channel/signal) is greater than a preset threshold value, whereby decoding may be performed. In this case, the corresponding threshold value may be set independently (or differently) per service type(/priority), PPPP or PPPR. For example, the above-described embodiment 9 may be enlaragedly applied even when the existing channel/signal is reused for measurement (or (BEAM) FAILURE-DETECTION, RLM, RRM, link quality(/channel state) related measurement).

mm-Wave Sidelink Communication, or Configuration of CP Length or Type

As the embodiment 10, in case of high carrier frequency (MM-WAVE), it may be difficult to maintain stable communication (or sidelink) due to channel characteristics such as high path attenuation. To solve this, communication (or sidelink communication) on high carrier frequency may be performed together with communication (or sidelink communication) on lower carrier frequency instead of being performed independently. In this case, beam (or antenna panel, AP, TXRU, or antenna element) management related control (or scheduling, data scheduling) information (for example, PSCCH) on high carrier frequency may be defined to be exchanged through low carrier frequency. In this case, if RLF occurs in communication (or sidelink communication) on low carrier frequency (and/or if a measurement value (for example, RSRP, RSRQ) for RLM-RS, PSBCH DMRS or synchronization signal on low carrier frequency is lower than a preset threshold value), communication (or sidelink communication) on low carrier frequency and/or communication (or sidelink communication) on high carrier frequency may be reconfigured (for example, RLF recovery operation, implementation of BFR procedure).

In detail, signaling (for example, BEAM SWEEPING TRIGGERING MESSAGE) as to when beam (or antenna panel, AP, TXRU) SWEEPING operation on high carrier frequency will be performed or triggered may be performed through communication (or sidelink communication) on low carrier frequency. When the transmitting UE sweeps transmission beam (or antenna panel, AP or TXRU), the receiving UE may arrange reception beam (or antenna panel, AP or TXRU) in the form of QUASI-OMNI, and when the receiving UE sweeps reception beam (or antenna panel, AP or TXRU), the transmitting UE may repeatedly transmit (or retransmit) transmission beam (or antenna panel, AP or TXRU).

As the embodiment 11, when a plurality of messages to be received using reception beams (or antenna panels, APs or TXRUs) of which all or some are different, at a specific time, exist, the UE may primarily select a reception beam (or antenna panel, AP or TXRU) in which a service related message (and/or preconfigured service or service type related message, message of relatively low PPPP value, message of relatively high PPPR value, and/or preconfigured channel/signal (for example, PSSS/SSSS, PSBCH, HARQ FEEDBACK, MEASUREMENT REPORTING, etc.) of (high priority)) of relatively high priority is received. Alternatively, the UE may primarily select a reception beam (or antenna panel, AP or TXRU), which may receive relatively many messages (or may receive messages at the same time), or may primarily select a reception beam (or antenna panel, AP or TXRU) having a relatively good measurement value (or beam RS measurement value) or link(/channel), or may primarily select a preconfigured reception beam (or antenna panel, AP or TXRU), or may primarily select a reception beam (or antenna panel, AP or TXRU) having a relatively low CBR measurement value (or CR value). In this case, it is assumed that the corresponding UE may form its reception beam (or antenna panel, AP or TXRU) in a limited direction at a random time.

Otherwise, when a plurality of messages to be received using transmission beams (or antenna panels, APs or TXRUs) of which all or some are different, at a specific time, exist, the UE may primarily select a transmission beam (or antenna panel, AP or TXRU) to which a service related message (and/or preconfigured service or service type related message, message of relatively low PPPP value, message of relatively high PPPR value, and/or preconfigured channel/signal (for example, PSSS/SSSS, PSBCH, HARQ FEEDBACK, MEASUREMENT REPORTING, etc.) of (high priority)) of relatively high priority is transmitted. Alternatively, the UE may primarily select a transmission beam (or antenna panel, AP or TXRU), which may receive relatively many messages (or may receive messages at the same time), or may primarily select a transmission beam (or antenna panel, AP or TXRU) having a relatively good measurement value (or beam RS measurement value) or link(/channel), or may primarily select a preconfigured transmission beam (or antenna panel, AP or TXRU), or may primarily select a transmission beam (or antenna panel, AP or TXRU) having a relatively low CBR measurement value (or CR value). In this case, it is assumed that the corresponding UE may form its transmission beam (or antenna panel, AP or TXRU) in a limited direction at a random time.

Also, as an example, when the UE should perform resource (or transmission resource) reservation per transmission beam (or antenna panel, AP or TXRU), the UE may primarily perform resource reservation for a transmission beam (or antenna panel, AP or TXRU) to which a service related message (and/or preconfigured service or service (type) related message, message of relatively low PPPP value, message of relatively high PPPR value, and/or preconfigured channel/signal (for example, PSSS/SSSS, PSBCH, HARQ FEEDBACK, MEASUREMENT REPORTING, etc.) of (high priority)) of relatively high priority is transmitted, or may primarily perform resource reservation for a transmission beam (or antenna panel, AP or TXRU) having relatively good link(/channel) quality (or beam RS measurement value), or may primarily perform resource reservation for a preconfigured transmission beam (or antenna panel, AP or TXRU), or may primarily perform resource reservation for a transmission beam (or antenna panel, AP or TXRU) having a relatively low CBR measurement value (or CR value).

As the embodiment 12, a CP length or type (or CP length or type used in transmitting UE) may vary depending on a distance between UEs (or UEs that perform communication), and the receiving UE may separate/receive channels/signals of different CP lengths or types (or different CP lengths or types transmitted from transmitting UEs located at different distances). For example, the CP length or type may be negotiated depending on the distance between UEs (or UEs that perform communication), and the transmitting UE may (properly) separate transmission of different CP lengths or types (for receiving UEs located at different distances). In this case, the CP lengths or types of the channels/signals used for negotiation may be preconfigured (exceptionally or in one type). For example, the CP length (or type) that may be used (or selected) per channel/signal may be configured independently (or differently).

Beam Management Control Information

As the embodiment 13, in the case that a UE performs sidelink communication through PC5 interface with another UE, the UE may report control information related to at least one beam management related to the PC5 interface to the BS. In this case, another UE may receive beam management control information related to the PC5 interface from the BS through uu interface. In other words, the beam management related control information on communication between the UE and another UE through the PC5 interface may be delivered from the UE to another UE through the BS (or by using the BS as a relay). Meanwhile, the BS may transmit the same control information as the control information reported from the UE to another UE, or may deliver the reported control information and control information reconfigured or corrected considering the status of the PC5 interface to another UE.

Alternatively, RELAYING/TETHERING operation may be performed using MM-WAVE based sidelink (SL) as an access link (for example, communication link between relay UE and remote UE). In this case, the relay UE may be a vehicle (for example, vehicle having no limitation to battery supply), and the remote UE may be a mobile/smart phone (for example, phone having a limited amount of battery). In this case, since the access link or sidelink management/control based on MM-WAVE only has high power consumption due to high ACQUISITION LATENCY, it may not be appropriate. Also, it may be difficult to (always) assume sidelink function/communication on low frequency carrier (or low frequency carrier for management/control or management/control of MM-WAVE access link/sidelink). In order to solve this problem, based on the following rules, the BS may manage/control MM-WAVE based access link (or sidelink) related beam (or antenna panel, AP or TXRU) through UU LINK. In this case, it may be assumed that the relay UE and the remote UE form connection (or RRC connection) with the BS (or same BS). Also, the following rules (or some rules) may restrictively be applied to the remote UE (and/or relay UE).

The UE may report a measurement value (for example, RSRP, RSRQ) information for SL beam (or beam RS) and/or related SL beam (or beam RS) information (or index/resource of related SL beam and index/resource of beam RS) to the BS through a predefined UU channel (for example, PUSCH). Also, the UE may report information as to SL BEAM (RS) FAILURE (or SL RLF) EVENT occurrence (or information as to whether SL BEAM (RS) FAILURE (or SL RLF) EVENT has occurred) (and/or RS where SL BEAM FAILURE (or SL RLF) has occurred, and/or information on service type) to the BS through a predefined UU channel (for example, PUSCH). Alternatively, when reporting the aforementioned information to the BS, the UE may additionally report, to the BS, its identifier, an identifier of another UE that performs communication (or relay/tethering communication) with itself, an identifier of a UE that has transmitted SL BEAM (RS) measured by itself, and/or an identifier of UE related to RS where SL beam failure (or SL RLF) has occurred.

Otherwise, the BS may indicate SL beam (RS) SWEEPING operation (and/or, SL BEAM (RS) measurement operation, SL BEAM (RS) reselection/discovery operation and/or SL BFR operation (and/or SL RLF recovery operation)) to the UE through a predefined UU channel (for example, PDCCH), or may signal configuration information on SL beam (RS) transmission (or measurement) related resource or transmission power. Otherwise, when signaling the corresponding information, the BS may notify the UE of an identifier of a target (or reception target) UE and an identifier of a UE (or relay UE) that transmits SL beam (RS) to be measured (by the remote UE) together with the corresponding information.

Since the embodiments of the above-described proposed methods may be included in one of the implementation methods of the present disclosure, it will be apparent that the embodiments may be regarded as a kind of proposed methods. In addition, the above-described proposed methods (embodiments 1 to 13) may independently be implemented, but may also be implemented in the form of combination (or merge) of some of the embodiments. For example, although the proposed method of the present disclosure has been described based on the 3GPP LTE system for convenience of description, a system to which the embodiments are applied may also be extended to another system other than the 3GPP LTE system. For example, the embodiments of the present disclosure may also be enlargedly applied for D2D communication. In this case, the D2D communication means that a UE performs communication with another UE directly by using a radio channel In this case, although the UE means a user terminal, when a network device such as the BS transmits and/or receives a signal in accordance with a communication scheme between UEs, the UE may also be regarded as a kind of the UE. Also, the embodiments of the present disclosure may be restrictively applied to MODE 3 V2X operation (and/or MODE 4 V2X operation). Also, the embodiments of the present disclosure may be restrictively applied to a preconfigured(/signaled) (specific) V2X channel (/signal) transmission (e.g., PSSCH (and/or (linked) PSCCH and/or PSBCH)). Also, for example, the proposed methods of the present disclosure may be restrictively applied to the case that a PSSCH and a (linked) PSCCH are adjacently (and/or non-adjacently) transmitted (on a frequency domain) (and/or a transmission based on a preconfigured(/signaled) MCS (and/or coding rate and/or RB) (value (/range)) is performed). Also, for example, the embodiments of the present disclosure may be restrictively applied between MODE #3 (and/or MODE #4) V2X carriers (and/or (MODE #4 (/3) SL (/UL) SPS (and/or SL (/UL) dynamic scheduling) carriers). Also, for example, the embodiments of the present disclosure may be (restrictively) applied to the case that a synchronization signal (transmission (and/or reception)) resource position and/or the number of synchronization signal resources between carriers (and/or subframe position related to V2X resource pool and/or the number of subframes (and/or subchannel size and/or the number of subchannels)) are identical (and/or (partially) different). For example, the embodiments of the present disclosure may be enlargedly applied to (V2X) communication between the BS and the UE. For example, the embodiments of the present disclosure may be restrictively applied to UNICAST (SIDELINK) communication (and/or MULTICAST (or GROUPCAST) (SIDELINK) communication and/or BROADCAST (SIDELINK) communication).

Figure 19:
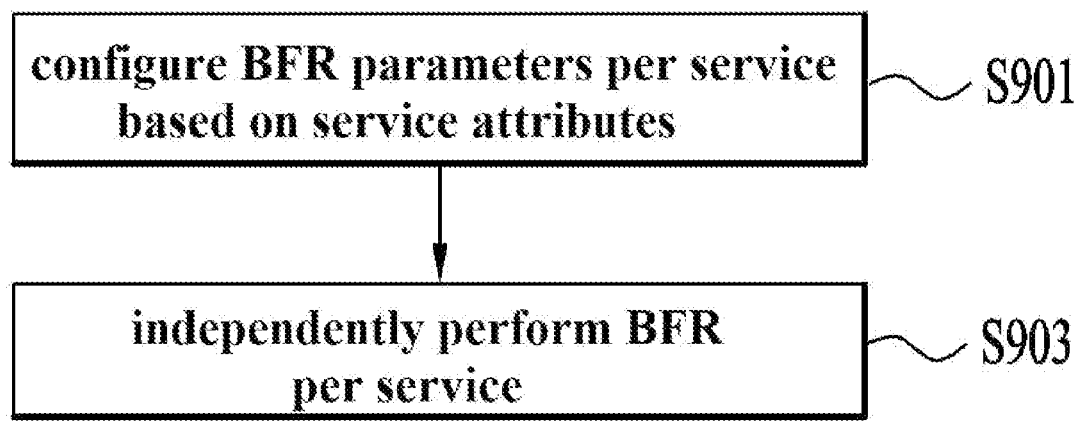
FIG. 19 is a flow chart illustrating a method for performing radio link monitoring per service in accordance with one embodiment.

FIG. 19 is a flow chart illustrating a method for performing radio link monitoring per service according to one embodiment.

In the case that wireless communication (or sidelink communication) is performed using a plurality of antenna units, channel state information (e.g., RSSI, RSRP, CBR, CR) measured per antenna panel may be different for specific resources. In detail, a sensing (or/and measurement) result for each antenna panel (or beam, AP, TXRU, or antenna element) may be different due to self-blocking of UE (or vehicle) body or reflective effect between UEs (vehicles), an effect based on an angle of an antenna panel (or beam, AP, TXRU, or antenna element)-attached surface, an effect based on formation of different radiation patterns based on different positions, beamforming gain, antenna gain or beam orientation, etc. For example, for a vehicle of a specific position, whether a vehicle blockage exists may be determined differently for each of antenna panels (or beams, Aps, TXRUs, or antenna elements) of different positions. Particularly, in the case that a UE provides a plurality of services by using a plurality of antenna units, a channel state is different per antenna unit and beam quality required in accordance with requirements is different per service, whereby a problem occurs in that a service suitable for the requirements is not provided.

Hereinafter, in the case that a plurality of services are provided using an antenna panel (or beam, AP, TXRU or antenna element), a method for independently performing at least one BFR parameter and BFR operation corresponding to each of the plurality of services will be described.

Referring to FIG. 19, a UE may configure BFR parameters for a plurality of services per service on the basis of service attributes (S901). In other words, the UE may independently configure BFR parameter per service on the basis of service attributes respectively corresponding to the plurality of services. In this case, the BFR parameter configuration operation per service includes an operation for directly configuring BFR parameter corresponding to service attributes by a UE, or an operation for previously receiving and storing configuration information on the BFR parameters corresponding to the service attributes from a BS or a network and configuring the BFR parameter corresponding to each service by selecting the BFR parameters corresponding to attributes of the service provided based on the configuration information. Also, the service attributes may include at least one of traffic priority related to services, latency requirements, and reliability.

The BFR parameters may include information on a BLER (Block Error Ratio) threshold value and BFI (Beam Failure Instance) times, wherein the BLER threshold value and the BFI times may be configured independently per service.

In detail, the UE may set the BLER threshold value differently per service on the basis of priority per service. In detail, the UE may set a corresponding BLER threshold value to a relatively low value with respect to services of high priority among the plurality of services. For example, in the present disclosure, the BLER threshold value may be lowered to the services of high priority, so that beam failure detection and recovery procedures may promptly be performed.

Otherwise, the UE may set BFI times differently per service on the basis of priority per service. In detail, the UE may set corresponding BFI times to a relatively low value with respect to services of high priority among the plurality of services. For example, in the present disclosure, the BFI times may be lowered to the services of high priority, so that beam failure detection and recovery procedures may promptly be performed. Alternatively, the UE may set the BLER threshold value and the BFI times differently on the basis of priority per service.

Otherwise, the UE may set a preset time for counting BFI times on the basis of the BLER threshold value on the basis of the priority. In detail, the UE may detect the beam failure for at least one beam in which BLER that has exceeded the BLER threshold is continuously detected for a preset time included in the BFR parameters and its detected times is more than the BFI times. For example, the UE may set the preset time to a relatively low value with respect to services of high priority among the plurality of services. Meanwhile, at least one beam is a beam for providing one service, and may declare beam failure if the beam failure is detected for all beams (or some beams) for one service.

Next, the UE may detect beam failure per service on the basis of the BLER threshold value and BFI times included in the BFR parameters (S903). Also, the UE may independently perform beam recovery corresponding to each service in which beam failure is detected.

In detail, if beam failure for a specific service is detected, the UE may perform an operation (beam recovery operation) for discovering new beam for the specific service among the plurality of services on the basis of a preset measurement threshold included in the BFR parameters. In this case, the UE may perform the beam recovery operation on the basis of the BFR parameters. For example, the BFR parameters may include information on an interference level allowable for at least one beam corresponding to another service based on discovery of new beam for one of the plurality of services. In this case, the allowable interference level is an allowable range of the interference level that interferes with beams corresponding to another service by beam sweeping based on the new beam discovery for the specific service. The allowable interference level may be configured relatively among the plurality of services on the basis of priority of each of the plurality of services. For example, with respect to a recovery operation for services of high priority, the UE may set the allowable interference level to a relatively high value to promptly resume the services.

Otherwise, the UE may set the preset measurement threshold on the basis of the service priority. In detail, the UE may set the preset measurement threshold to a relatively high value with respect to services of high priority among the plurality of services, thereby providing beam of high quality corresponding to high priority.

Otherwise, in the case that a UE performs sidelink communication through PC5 interface with another UE, the UE may report control information related to at least one beam management related to the PC5 interface to the BS. In this case, another UE may receive beam management control information related to the PC5 interface from the BS through uu interface. In other words, the beam management related control information on communication between the UE and another UE through the PC5 interface may be delivered from the UE to another UE through the BS (or by using the BS as a relay). Meanwhile, the BS may transmit the same control information as the control information reported from the UE to another UE, or may deliver the reported control information and control information reconfigured or corrected considering the status of the PC5 interface to another UE.

Meanwhile, as described above, the beam may be or be replaced with an element corresponding to antenna panel, AP, TXRU or antenna element.

Communication System and Communication Device

Figure 20:
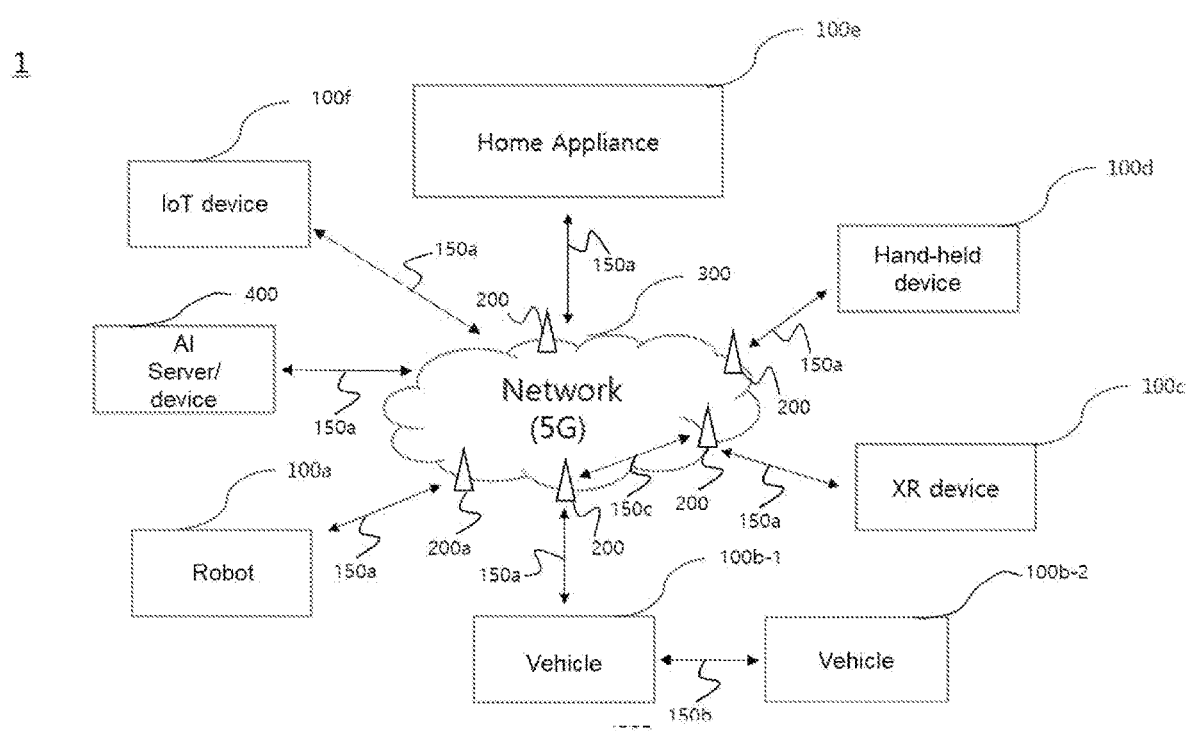
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

As described above, the base station 200 may classify WUS signals for each UE group or subgroup. The base station is a CDM scheme according to the above-described embodiments. The WUS signal may be classified for each UE group or subgroup by using at least one of the TDM method and the FUM method. As in the above-described embodiment, the base station may be configured to distinguish WUS resources for each WUS signal. The base station may transmit WUS configuration information for the WUS resource to the UEs, such as a higher layer signal. Thereafter, the base station may transmit a corresponding WUS signal within the WUS resource corresponding to the WUS configuration information.

Examples of Wireless Devices to which the Present Disclosure is Applied

Figure 21:
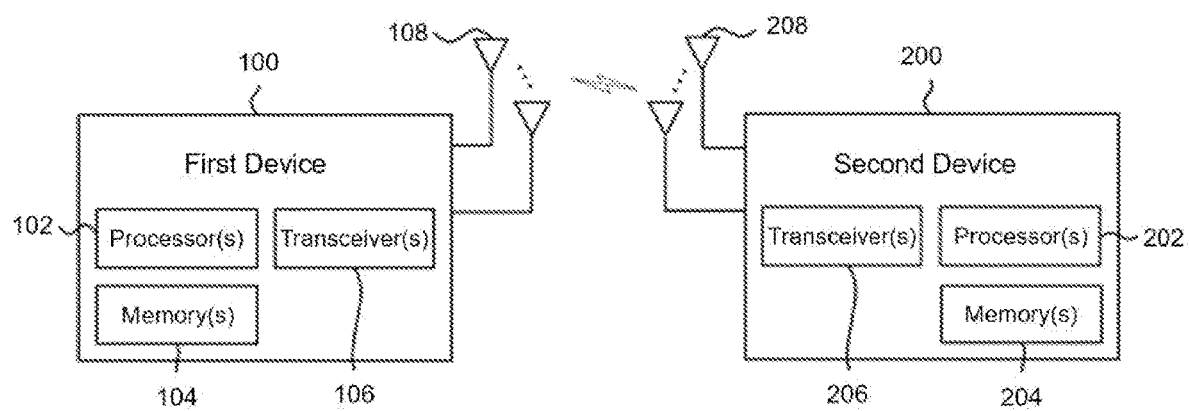
FIG. 21 illustrates wireless devices applicable to the present disclosure.

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The processor 102 may configure the BFR parameters for a plurality of services per service on the basis of service attributes in accordance with a program stored in the memory 104. Also, the processor 102 may detect beam failure for at least one beam corresponding to each service on the basis of a BLER (Block Error Ratio) threshold value and BFI (Beam Failure Instance) times included in the BFR parameters. Moreover, the processor 102 may perform a beam recovery procedure for discovering new beam for a service corresponding to at least one beam in which the beam failure is detected.

Moreover, the processor 102 may configure a detailed BFR parameter based on the service attributes described in FIG. 19, etc. on the basis of the program stored in the memory 104, and may perform a detailed beam failure detection operation based on the BFR parameters or a detailed beam recovery operation based on the BFR parameters.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters An Example of a Signal Processing Circuit to which the Present Disclosure is Applied FIG. 22 illustrates a signal process circuit for a transmission signal.

Figure 22:
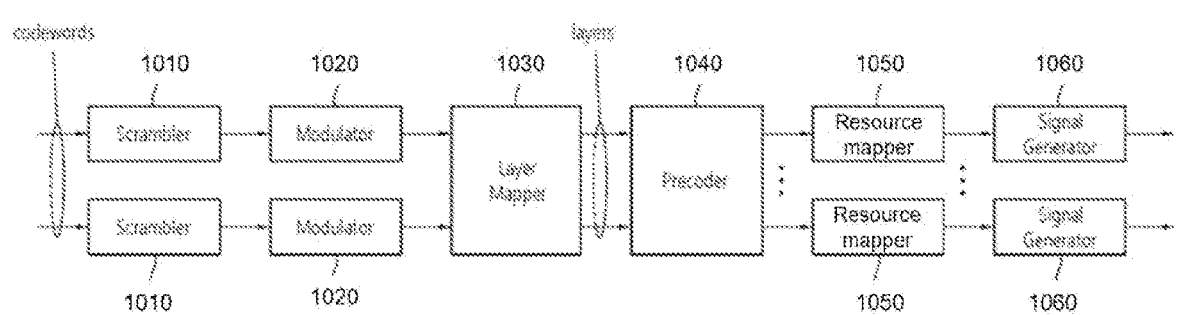
FIG. 22 illustrates a signal process circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Wireless Devices to which the Present Disclosure is Applied

Figure 23:
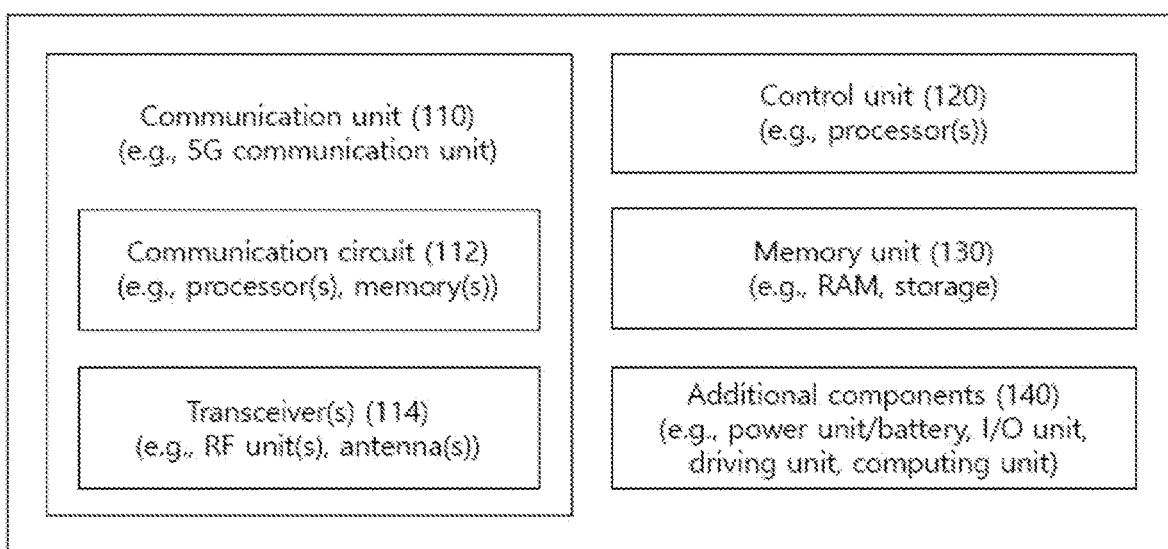
FIG. 23 illustrates another example of a wireless device applied to the present disclosure.

FIG. 23 illustrates another example of a wireless device applied to the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. W1), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 24:
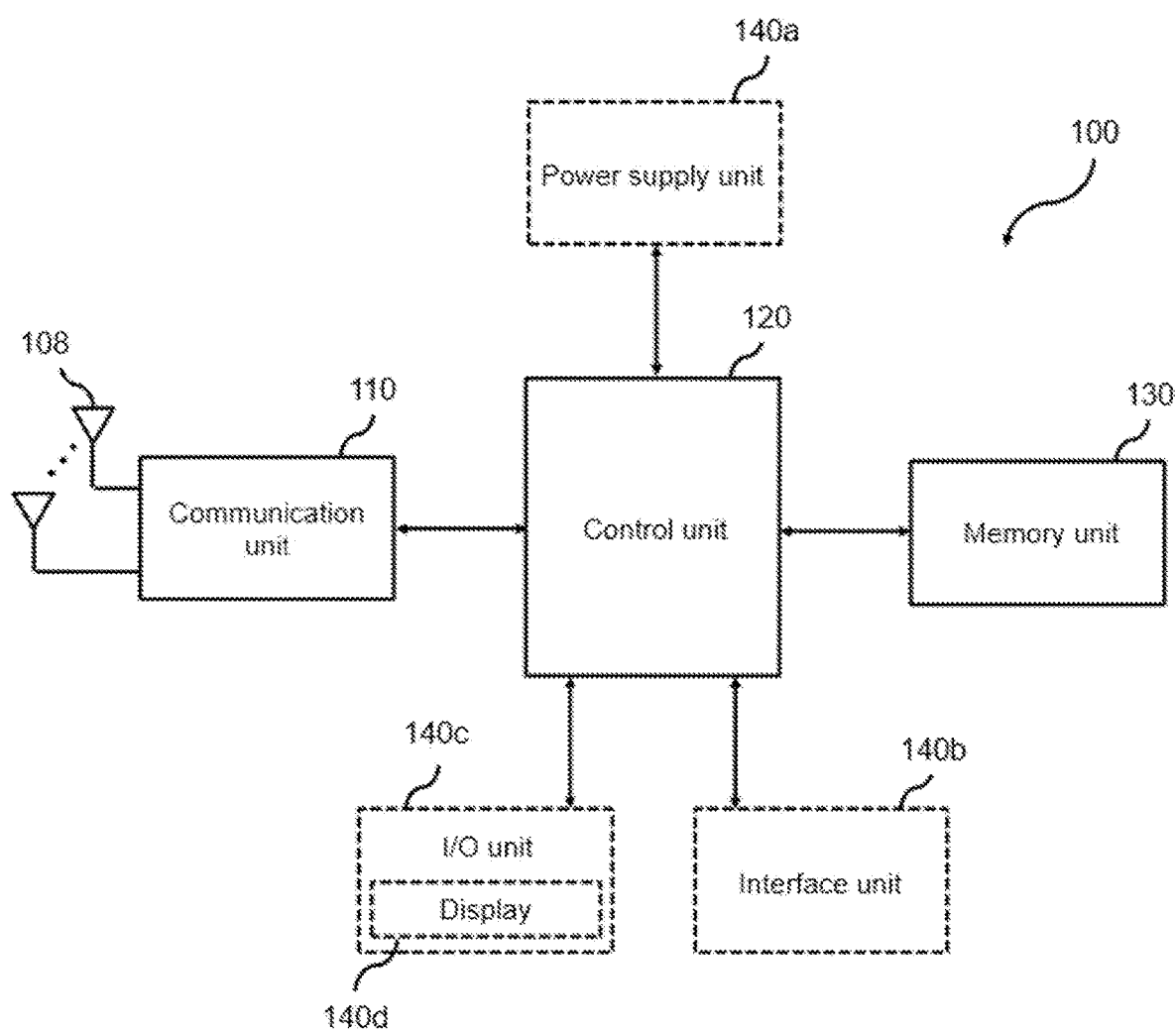
FIG. 24 illustrates a hand-held device applied to the present disclosure.

Hereinafter, an example of implementing FIG. 23 will be described in detail with reference to the drawings Examples of Mobile Devices to which the Present Disclosure is Applied FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 25:
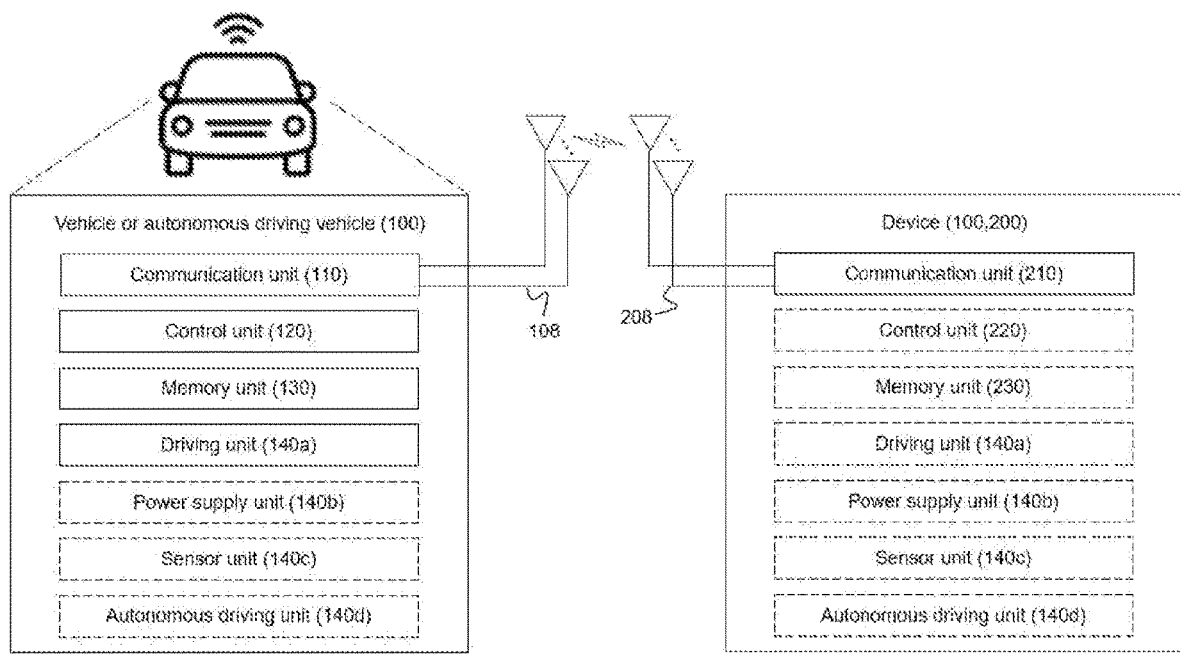
FIG. 25 illustrates a vehicle or an autonomous driving vehicle applied to the present disclosure.

Examples of Vehicles or Autonomous Vehicles to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described above, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method of performing radio link monitoring by a user equipment (UE) in a wireless communication system supporting a sidelink, the method comprising:
   receiving configuration information including beam failure recovery (BFR) parameters related to a block error ratio (BLER) threshold and N,
   wherein N is an integer;
   calculating the BLER for at least one beam for each of a plurality of services;
   detecting a beam failure instance (BFI) based on the calculated BLER for the at least one beam that is greater than or equal to the BLER threshold included in the configuration information;
   operating a first timer based on the detection of the BFI; and
   detecting a beam failure for the at least one beam based on the BFI detected N times consecutively during operation of the first timer,
   wherein each of the plurality of services is configured with a service attribute for at least one of a priority and a reliability, and
   wherein the BLER threshold and the N are independently configured for each of the plurality of services based on the priority for each service.

2. The method of claim 1, wherein the BLER threshold value is set to a relatively low value with respect to services of high priority among the plurality of services.

3. The method of claim 1, wherein the N is configured to a relatively low value for a service with a high priority among the plurality of services.

4. The method of claim 1, wherein the first timer operates for a pre-configured time,
   wherein the preconfigured time is are independently configured for each of the plurality of services based on the priority for each service,
   wherein the preconfigured time is set to a low value with respect to services of high priority among the plurality of services.

5. The method of claim 1, further comprising:
   discovering new beam for a service corresponding to at least one beam in which the beam failure is detected, among the plurality of services, on the basis of a preset measurement threshold included in the BFR parameter.

6. The method of claim 5, wherein the BFR parameter further includes information on an interference level allowed for at least one beam corresponding to another service based on discovery of new beam for one service among the plurality of services.

7. The method of claim 6, wherein the allowed interference level is relatively set among the plurality of services on the basis of priority of each of the plurality of services.

8. The method of claim 5, wherein the preset measurement threshold is set to a high value with respect to services of high priority among the plurality of services.

9. The method of claim 5, wherein the preset measurement threshold includes a threshold value for at least one of RSRQ (Reference Signal Received Quality) and RSRP (Reference Signal Received Power).

10. The method of claim 1, wherein in the case that the UE transmits at least one beam from a first band of 6 Ghz or more, control information related to management of at least one beam is received from a second band less than 6 Ghz.

11. The method of claim 1, further comprising:
transmitting mapping information between the plurality of services and at least one beam corresponding to each of the plurality of services or configuration information of the BFR parameter per service.

12. The method of claim 1, wherein a plurality of antenna units are disposed to be mutually distributed to acquire variety of transmission and reception directions through physical distribution among the antenna units.

13. A device performing radio link monitoring in a wireless communication system supporting a sidelink, the device comprising:

a transceiver; and
a processor connected to the transceiver,
wherein the processor is configured to:
control the transceiver to receive configuration information including beam failure recovery (BFR) parameters related to a block error ratio (BLER) threshold and N,
calculate the BLER for at least one beam for each of a plurality of services,
detect a beam failure instance (BFI) based on the calculated BLER for the at least one beam that is greater than or equal to the BLER threshold included in the configuration information,
operate a first timer based on the detection of the BFI, and
detect a beam failure for the at least one beam based on the BFI detected N times consecutively during operation of the first timer,
wherein N is an integer,
wherein each of the plurality of services is configured with a service attribute for at least one of a priority and a reliability, and
wherein the BLER threshold and the N are independently configured for each of the plurality of services based on the priority for each service.

* * * * *